US007852505B2

(12) United States Patent
Kumagai

(10) Patent No.: US 7,852,505 B2
(45) Date of Patent: Dec. 14, 2010

(54) NETWORK SYSTEM AND CONTROL METHOD OF THE SAME

(75) Inventor: Takekazu Kumagai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1004 days.

(21) Appl. No.: 11/201,143

(22) Filed: Aug. 11, 2005

(65) Prior Publication Data

US 2006/0001907 A1    Jan. 5, 2006

Related U.S. Application Data

(62) Division of application No. 09/620,125, filed on Jul. 20, 2000, now Pat. No. 6,947,182.

(30) Foreign Application Priority Data

Jul. 26, 1999 (JP) ................................. 11-210833

(51) Int. Cl.
   *H04N 1/00* (2006.01)
(52) U.S. Cl. ................. 358/1.15; 358/1.13; 358/1.16; 358/401; 358/403; 358/474; 709/223; 709/224
(58) Field of Classification Search .............. 358/1.15, 358/1.16, 1.17, 400, 403, 407, 1.1, 1.13, 358/401, 402, 474; 399/79, 387; 709/223, 709/224, 225, 229
See application file for complete search history.

(56) References Cited

U.S. PATENT DOCUMENTS

| 4,994,926 A | 2/1991 | Gordon et al. | ............... | 358/400 |
|---|---|---|---|---|
| 5,398,283 A | 3/1995 | Virga | .......................... | 380/243 |
| 5,461,488 A | 10/1995 | Witek | .......................... | 358/402 |
| 5,559,721 A | 9/1996 | Ishii | ........................... | 709/206 |
| 5,590,196 A | 12/1996 | Moreau | ........................ | 705/78 |

(Continued)

FOREIGN PATENT DOCUMENTS

JP         10-243151        9/1998

(Continued)

OTHER PUBLICATIONS

Patel et al., "Multimedia Fax-MIME Internetworking" Multimedia Communications Research Laboratory, University of Ottawa IEEE 1994.

(Continued)

*Primary Examiner*—Twyler L Haskins
*Assistant Examiner*—Kent Yip
(74) *Attorney, Agent, or Firm*—Fitzpatrick, Cella, Harper & Scinto

(57) ABSTRACT

This invention relates to management of facsimile information in a network system to which a document distribution server, a client terminal, and a facsimile apparatus are connected. When operated, this facsimile apparatus transmits information concerning the operation to the server. When an image is transmitted as a result of operation, information concerning the result of this transmission is also transmitted to the server. The server stores in a database the received information pertaining to the operation of the facsimile apparatus, the transmitted image, and the received information pertaining to the transmission result. Whether these pieces of information are to be transmitted to the server is set for each client. Each client can acquire operation log information of the facsimile apparatus by looking up the database.

8 Claims, 22 Drawing Sheets

U.S. PATENT DOCUMENTS

| | | | |
|---|---|---|---|
| 5,644,404 A * | 7/1997 | Hashimoto et al. | 358/402 |
| 5,870,549 A | 2/1999 | Bobo, II | 709/206 |
| 5,872,638 A * | 2/1999 | Haze | 358/405 |
| 5,877,746 A | 3/1999 | Parks et al. | 345/156 |
| 6,061,502 A | 5/2000 | Ho et al. | 358/1.15 |
| 6,185,546 B1 | 2/2001 | Davis | 705/51 |
| 6,313,926 B1 | 11/2001 | Kumagai et al. | 358/442 |
| 6,396,597 B1 | 5/2002 | Marshall | 358/400 |
| 6,437,873 B1 | 8/2002 | Maeda | 358/1.15 |
| 6,570,667 B1 | 5/2003 | Hattori et al. | 358/1.15 |
| 6,581,092 B1 | 6/2003 | Motoyama et al. | 709/219 |
| 6,633,413 B1 | 10/2003 | Schlank et al. | 358/468 |
| 6,718,378 B1 * | 4/2004 | Machida | 709/223 |
| 6,771,385 B1 | 8/2004 | Iizuka et al. | 358/1.15 |
| 6,785,023 B1 | 8/2004 | Iida | 358/442 |
| 6,947,182 B1 * | 9/2005 | Kumagai | 358/402 |
| 6,952,278 B2 * | 10/2005 | Miyahara et al. | 358/1.15 |
| 6,961,140 B2 * | 11/2005 | Moore et al. | 358/1.15 |
| 7,002,702 B1 * | 2/2006 | Machida | 358/1.15 |
| 2002/0048049 A1 | 4/2002 | Ejiri | 358/434 |
| 2007/0013962 A1 * | 1/2007 | Hayashi | 358/403 |

FOREIGN PATENT DOCUMENTS

| | | |
|---|---|---|
| JP | A 10-240687 | 9/1998 |
| JP | A 10-243151 | 9/1998 |
| JP | 11-146166 A | 5/1999 |
| JP | 11-161111 A | 6/1999 |
| JP | A 11-243470 | 9/1999 |

OTHER PUBLICATIONS

Sheng et al., "Internet-Based Mail Fax Gateway Technology" 1997 IEEE International Conference on Intelligent Processing Systems.

Patel et al., "The Multimedia Fax-MIME Gateway" University of Ottawa IEEE 1994.

* cited by examiner

FIG. 8

| | | |
|---|---|---|
| SHARED DATA | USER MANAGEMENT INFORMATION | |
| | SERVER MANAGEMENT INFORMATION | |
| | SHARED ADDRESS DATA | |
| | SHARED DOCUMENT DATA | |
| | SHARED DOCUMENT ANNOTATION INFORMATION | |
| | LOG DATA | |
| | TEMPORARY SAVED DOCUMENT DATA | |
| | ... | |
| USER 1 DATA | DOCUMENT DATA | inBox DATA |
| | | OutBox DATA |
| | | Scan DATA |
| | | SentFax DATA |
| | | Trash DATA |
| | | USER 1 FOLDER 1 |
| | ADDRESS DATA | |
| | DEVICE SETTING DATA | |
| USER 2 DATA | DOCUMENT DATA | inBox DATA |
| | | OutBox DATA |
| | | Scan DATA |
| | | SentFax DATA |
| | | Trash DATA |
| | | USER 2 FOLDER 1 |
| | ADDRESS DATA | |
| | DEVICE SETTING DATA | |
| ... | | |

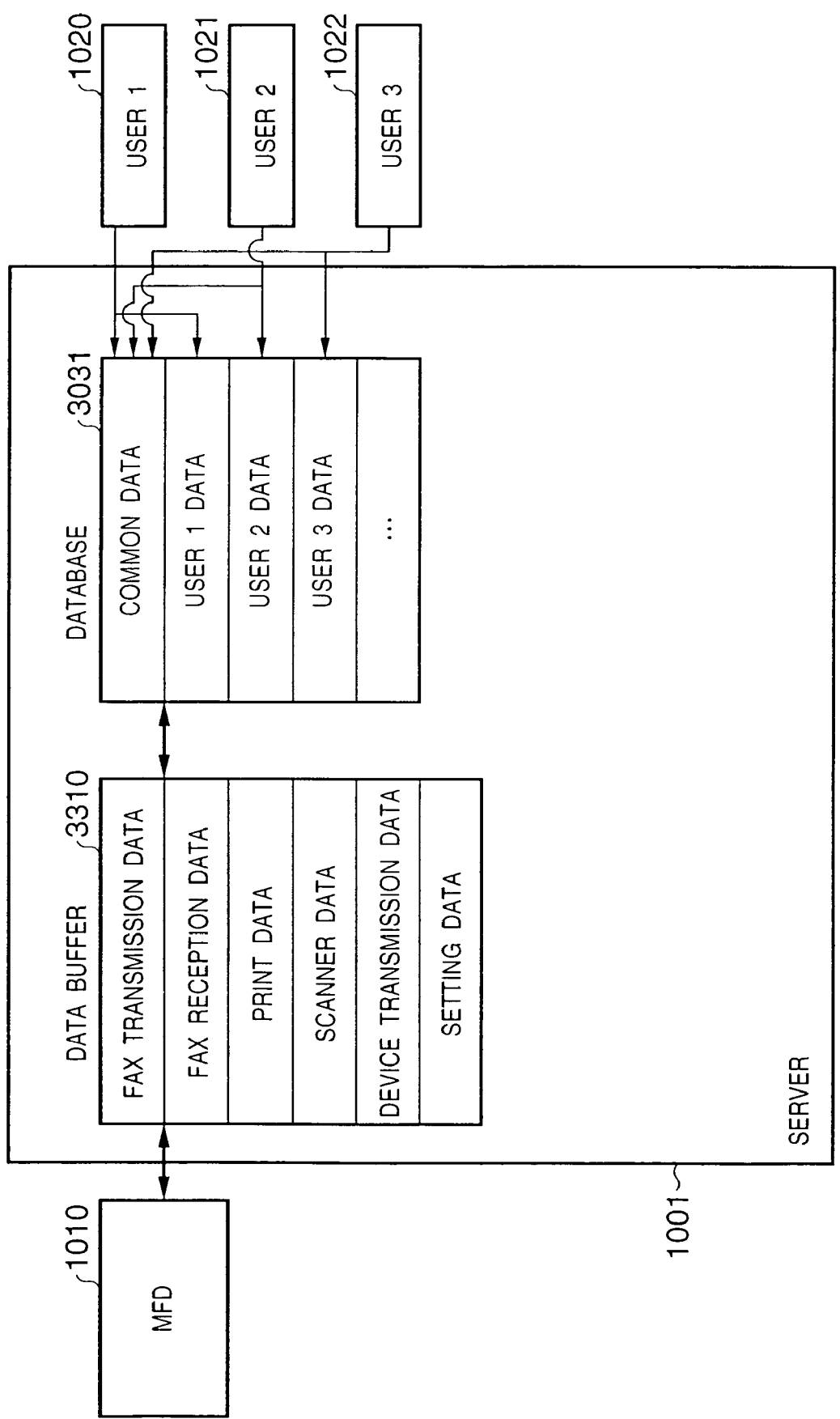

FIG. 15

| | | |
|---|---|---|
| SHARED DATA | USER MANAGEMENT INFORMATION | |
| | SERVER MANAGEMENT INFORMATION | |
| | SHARED ADDRESS DATA | |
| | SHARED DOCUMENT DATA | |
| | SHARED DOCUMENT ANNOTATION INFORMATION | |
| | LOG DATA | |
| | TEMPORARILY SAVED DOCUMENT DATA | |
| | ... | |
| USER 1 DATA | DOCUMENT DATA | inBox DATA |
| | | OutBox DATA |
| | | Scan DATA |
| | | SentFax DATA |
| | | Trash DATA |
| | | USER 1 FOLDER 1 |
| | ADDRESS DATA | |
| | DEVICE SETTING DATA | |
| ... | | |
| GROUP 1 DATA | GROUP USER LIST | |
| | USABLE DEVICE LIST | |
| | DOCUMENT DATA | RECEIVED DOCUMENT DATA |
| | | SHARED DOCUMENT DATA |
| | | SHARED DOCUMENT ANNOTATION INFORMATION |
| ... | | |
| DEVICE DATA | RECEIVED DOCUMENT DISTRIBUTION GROUP | |
| | SCAN DESTINATION | |
| ... | | |

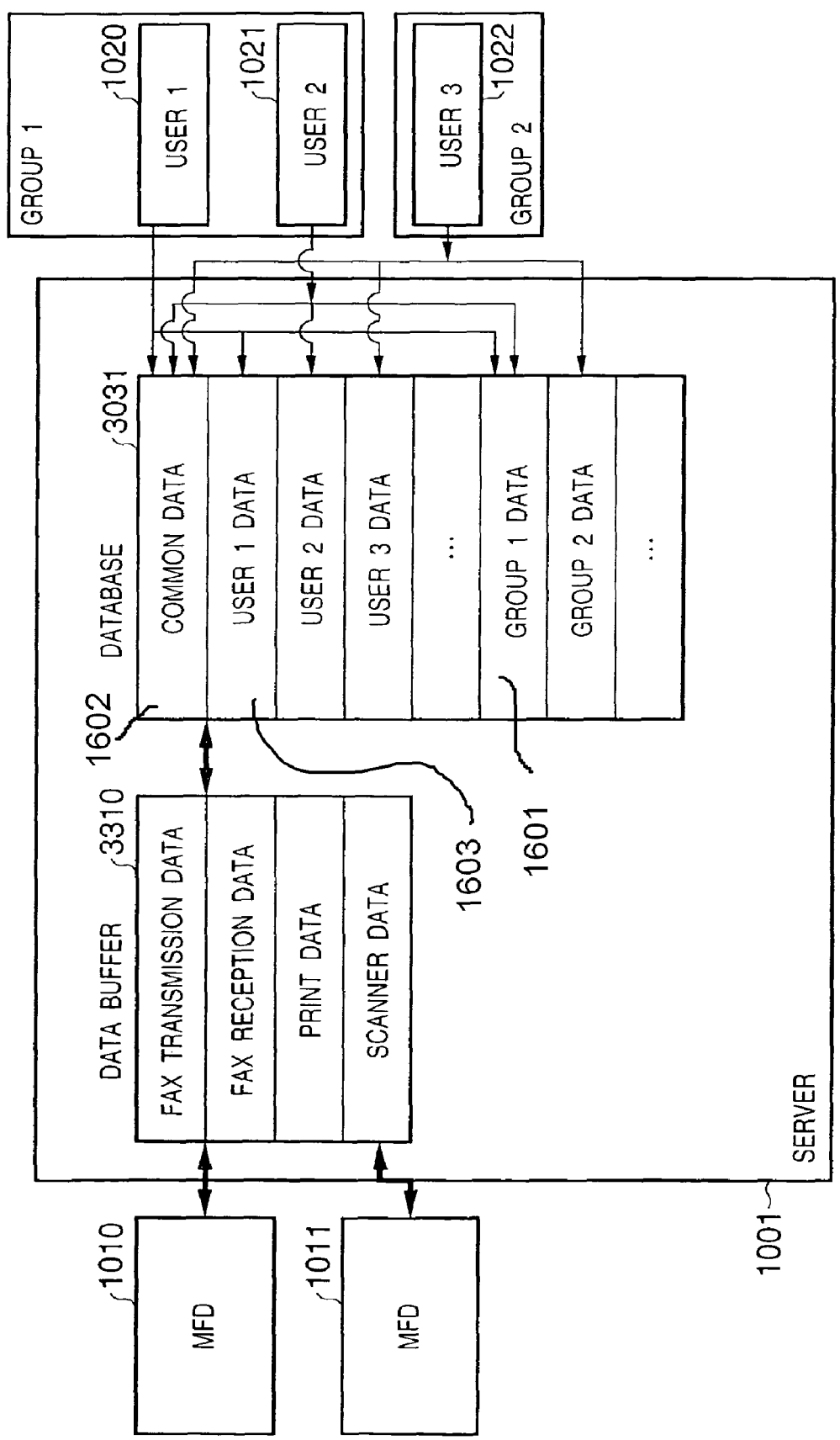

F I G. 19
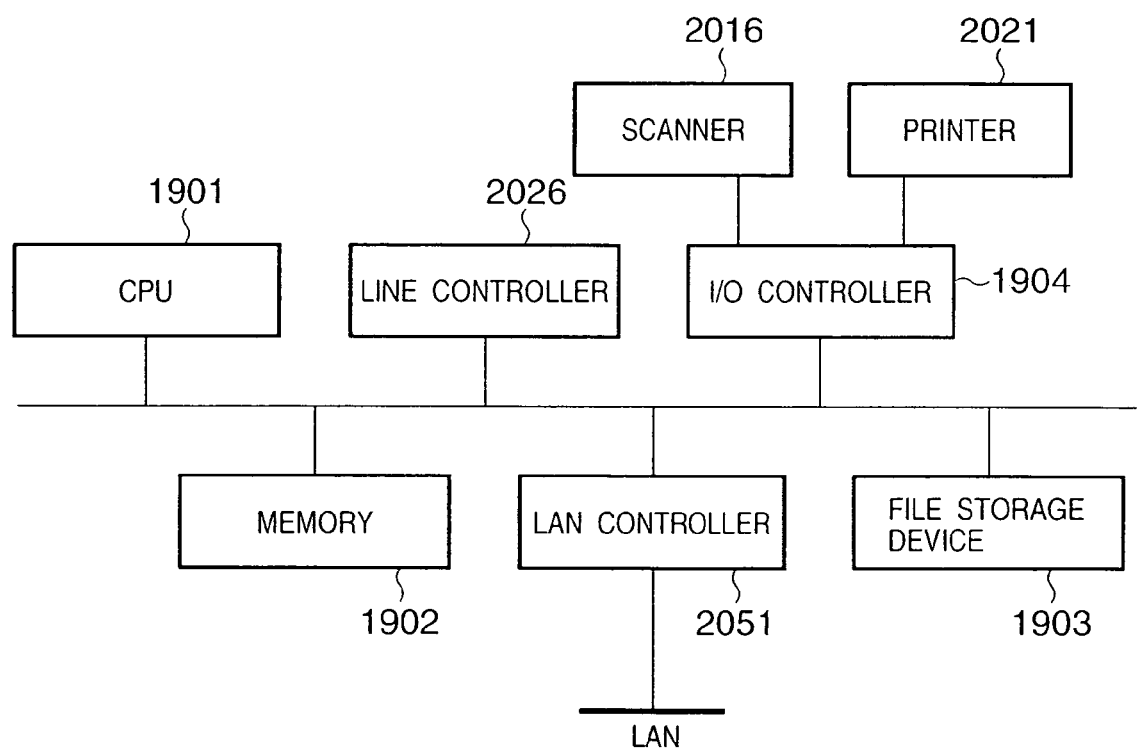

NETWORK SYSTEM AND CONTROL METHOD OF THE SAME

CROSS-REFERENCE TO RELATED APPLICATION

This application is a divisional of U.S. patent application Ser. No. 09/620,125, filed Jul. 20, 2000 now U.S. Pat. No. 6,947,182, the entire disclosure of which is incorporated herein by reference.

BACKGROUND OF THE INVENTION

1. Field of the Invention

The present invention relates to a network system for managing documents and the like by connecting, e.g., a multifunctional device including a facsimile function and the like, a server, and a client on a local area network, and a control method of this network system.

2. Description of the Related Art

A system is conventionally available in which a terminal, such as a facsimile modem, having a facsimile communication function is connected to a network such as a LAN and this terminal is connected as a facsimile server to a telephone line. In a LAN system like this, facsimile communication can be performed by instructions from a client terminal on the LAN. Also, the facsimile terminal can be used as a facsimile apparatus in the same manner as a stand-alone facsimile apparatus.

In some LAN systems as described above, a client terminal can later confirm the record of facsimile transmission performed by the user.

Unfortunately, if facsimile transmission is performed not across a LAN but by directly operating the operation panel or the like of a facsimile apparatus connected to a LAN system, the transmission log cannot be referred to from a desired client terminal or a server terminal on the LAN, although it may be obtained by directly operating the facsimile apparatus.

Also, when facsimile transmission is performed by directly operating the facsimile apparatus, even if a client terminal or a server terminal has data such as a telephone directory unique to the user, the transmission cannot be performed by looking up the telephone directory.

Furthermore, in a LAN system like this, when a multifunction terminal is used by which a facsimile apparatus can also be used as a scanner or a printer, the record of facsimile communication remains as a log. However, no log of printing, scanning, or distribution of facsimile-received data to a terminal on the LAN remains; i.e., no log of processing other than facsimile communication via telephone line remains.

SUMMARY OF THE INVENTION

It is an object of the present invention to provide a network system which eliminates the above conventional problems, and a control method of the system.

It is another object of the present invention to provide a network system in which information such as a telephone directory used by a device in executing a job can be shared by a client, and a control method of the system.

It is still another object of the present invention to provide a network system in which data processed by a device can be shared on the network where necessary, and a control method of the system.

It is still another object of the present invention to provide a network system in which the log of a job executed by a device can be provided to a terminal on the network where necessary, and a control method of the system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a view showing the configuration of a database in a document distribution server in the first and second embodiments;

FIG. 9 is a view of a data flow via the document distribution server in the first embodiment;

FIG. 15 is a view of the configuration of a database in a document distribution server in the third embodiment;

FIG. 16 is a view of a data flow via the document distribution system in the third embodiment;

FIG. 19 is another block diagram of the multifunctional device;

DETAILED DESCRIPTION OF THE PREFERRED EMBODIMENTS

First Embodiment

Figure 1:
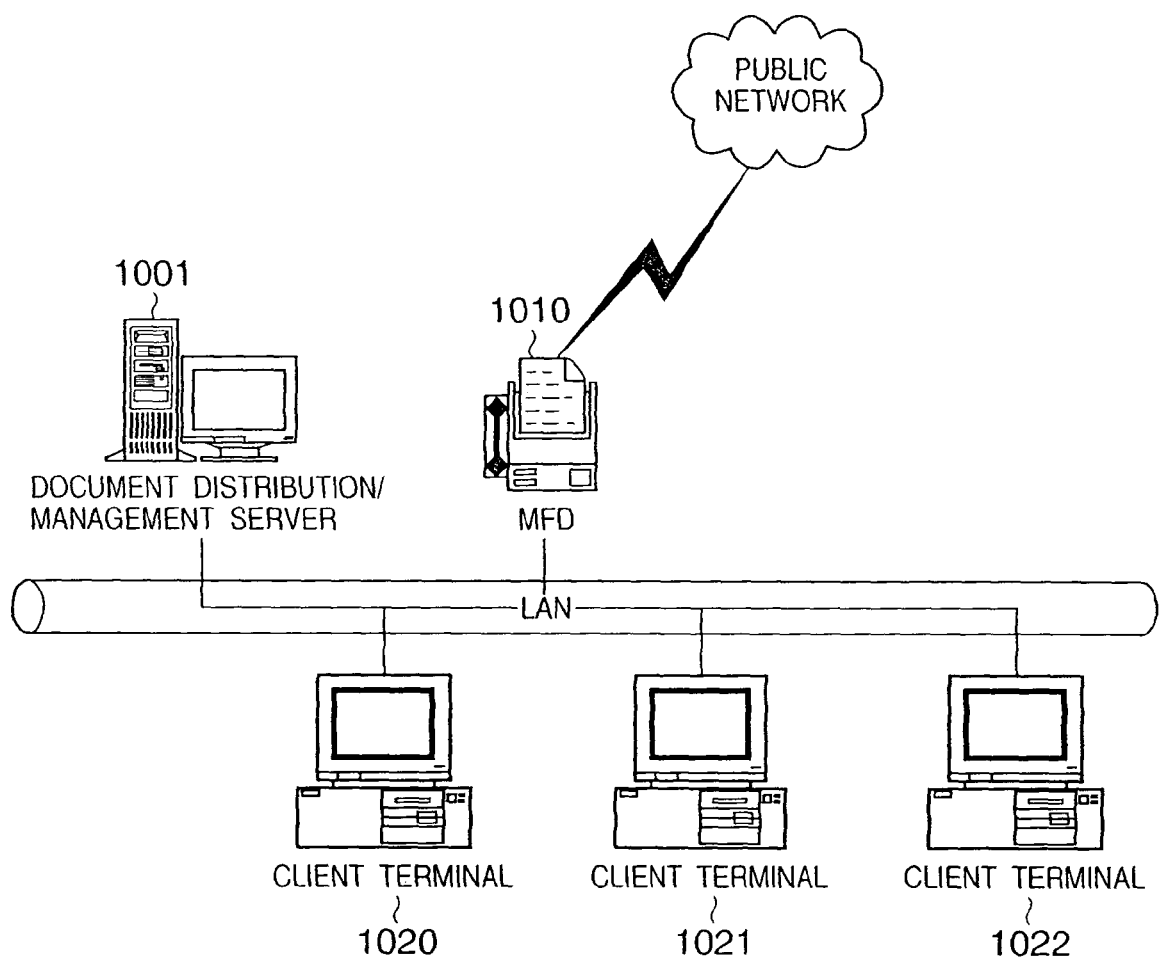
FIG. 1 is a view showing the arrangement of a document distribution system in the first and second embodiments.

The first embodiment of the present invention will be described below with reference to the accompanying drawings. FIG. 1 is a view of the arrangement of a document distribution system according to this embodiment.

Referring to FIG. 1, a document distribution/management server 1001 is placed on a LAN, and one multifunctional device (MFD) 1010 for executing various services by connecting to this document distribution/management server 1001 and a plurality of (in this embodiment, three) client terminals 1020, 1021, 1022 as service environments for users are arranged on the same LAN such as the Internet. The MFD 1010 is connected to a public network (telephone line) to perform facsimile communication.

Figure 2:
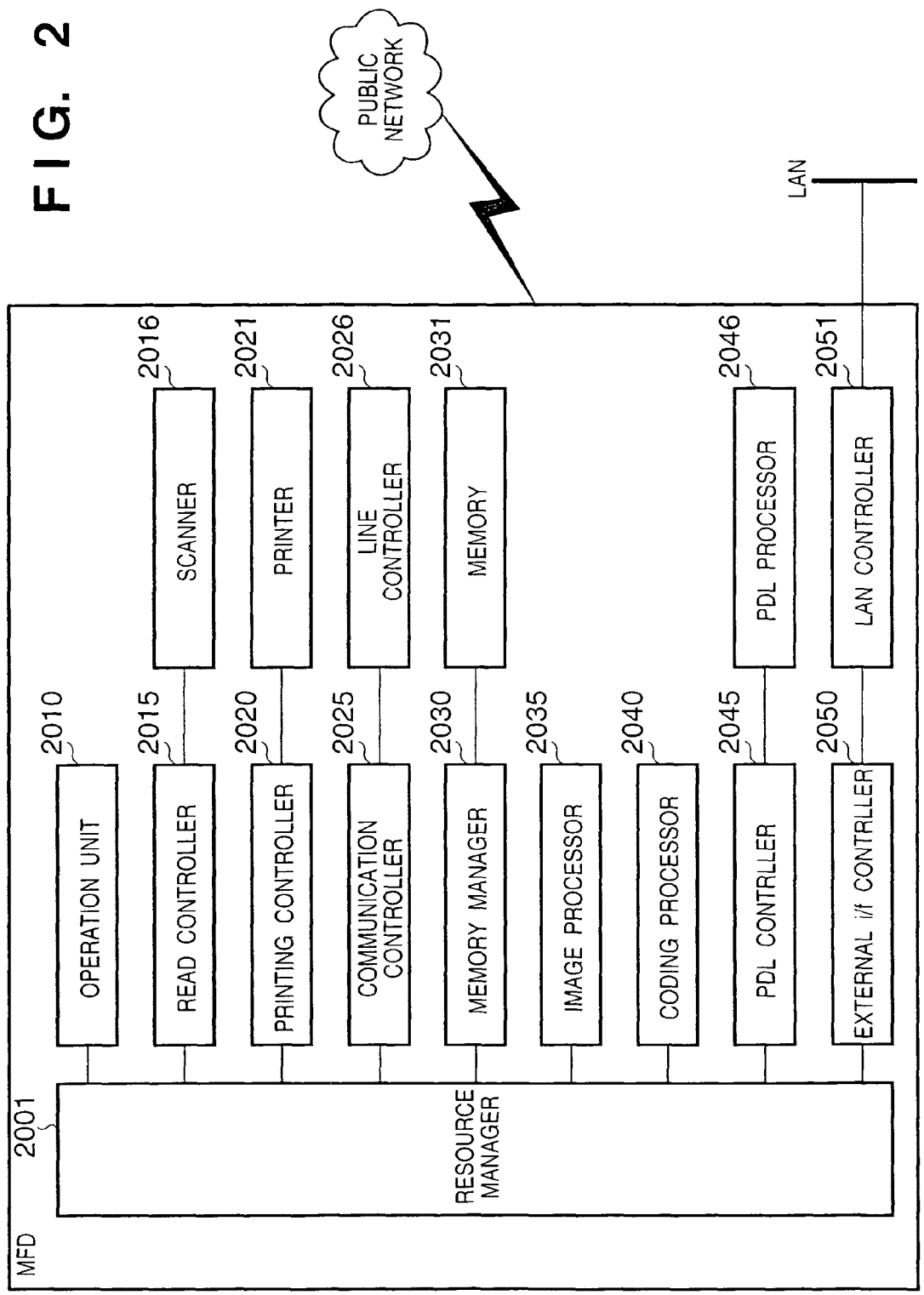
FIG. 2 is a block diagram of a multifunctional device.

FIG. 2 is a block diagram of the multifunctional device (MFD).

A resource manager 2001 manages various resources 2010 to 2051 supported as devices and performs scheduling of each requested job and the like.

An operation unit 2010 receives manual instructions from a user and displays data on a display unit. This operation unit 2010 serves as a user interface for providing terminal functions to a user.

A read controller 2015 controls a scanner 2016 for reading an image on an original.

A printing controller 2020 controls a printer 2021 for printing an image on a printing sheet.

A communication controller 2025 controls FAX transmission/reception via a line controller 2026.

A memory manager 2030 allocates resources of a memory 2031 to individual controllers, manages storage of various document data, and manages registration of device setting data such as abbreviated dial data and read mode data.

An image processor 2035 performs image processing, such as sheet size conversion, resolution conversion, and smoothing, particularly necessary in FAX transmission and reception recording.

A coding processor 2040 mainly performs encoding and decoding, such as MH, MR, MMR, and JBIG, commonly used for FAX transmission/reception.

A PDL controller 2045 converts data (PDL data) described in a page description language and received via the LAN into video data by using a PDL processor 2046. This data is transferred to the printing controller 2020 and output by the printer 2021.

An external i/f controller 2050 performs predetermined data communication, job management, and control with respect to a server on the LAN via a LAN controller 2051. For example, this external i/f controller 2050 receives a transmission job and a print job from the server and transfers received data and scanned data to the server under the management of the resource manager 2001.

This MDF 1010 also has a function of designating a client from the operation unit 2010 in order to transfer scanned data for a specific user (client) on the network to the server.

Furthermore, the MFD 1010 communicates with the server 1001 to perform the following processing.

(1) "User Authentication"

When a user ID and password are entered by an operation on the operation unit 2010 by a user, the server 1001 is asked across the LAN to return the result of user authentication (login). When the authentication is successful, device setting data of the user authenticated by the server 1001 is acquired and stored in the memory 2031. When the user performs a logout operation on the operation unit 2010, a logout process is performed. If no such operation is performed, the logout process is automatically performed when a predetermined time has elapsed from the last processing. This logout process erases all data stored in the memory 2031 upon login.

(2) "Abbreviated Dial Data Registration"

In accordance with an operation on the operation unit 2010, abbreviated dial data is registered, edited, or deleted, and the result is stored in the memory 2031 on the device. Also, to request the server 1001 to update address data of each user explained in FIG. 8, relevant controllers are controlled under the management of the resource manager 2001.

(3) "Copying Operation"

In accordance with an operation on the operation unit 2010, relevant controllers are controlled under the management of the resource manager 2001 so that an image on an original set on the scanner 2016 is read and output to the printer 2016.

(4) "FAX Transmission"

In accordance with an operation on the operation unit 2010, relevant controllers are controlled under the management of the resource manager 2001 so that an image on an original set on the scanner 2016 is read and the data is transferred from the line controller 2026. The transmitted image data is saved in a database constructed on a hard disk of the server 1001.

(5) "FAX Reception"

Relevant controllers are controlled under the management of the resource manager 2001 such that image data received via the line controller 2060 is temporarily stored in the memory 2031 and, generally, printed out as a received document output from the printer 2021, or transferred to the server 1001 via the LAN controller 2051.

(6) "Scan"

Related controllers are controlled under the management of the resource manager 2001 such that an image is read by the scanner 2016 and the read image data is transferred to the server 1001 via the LAN controller 2051.

(7) "Print"

Printing data such as PDL data supplied from a terminal on the LAN is printed by the printer 2021.

The MFD 1010 can execute the processing exemplified above.

Figure 3:
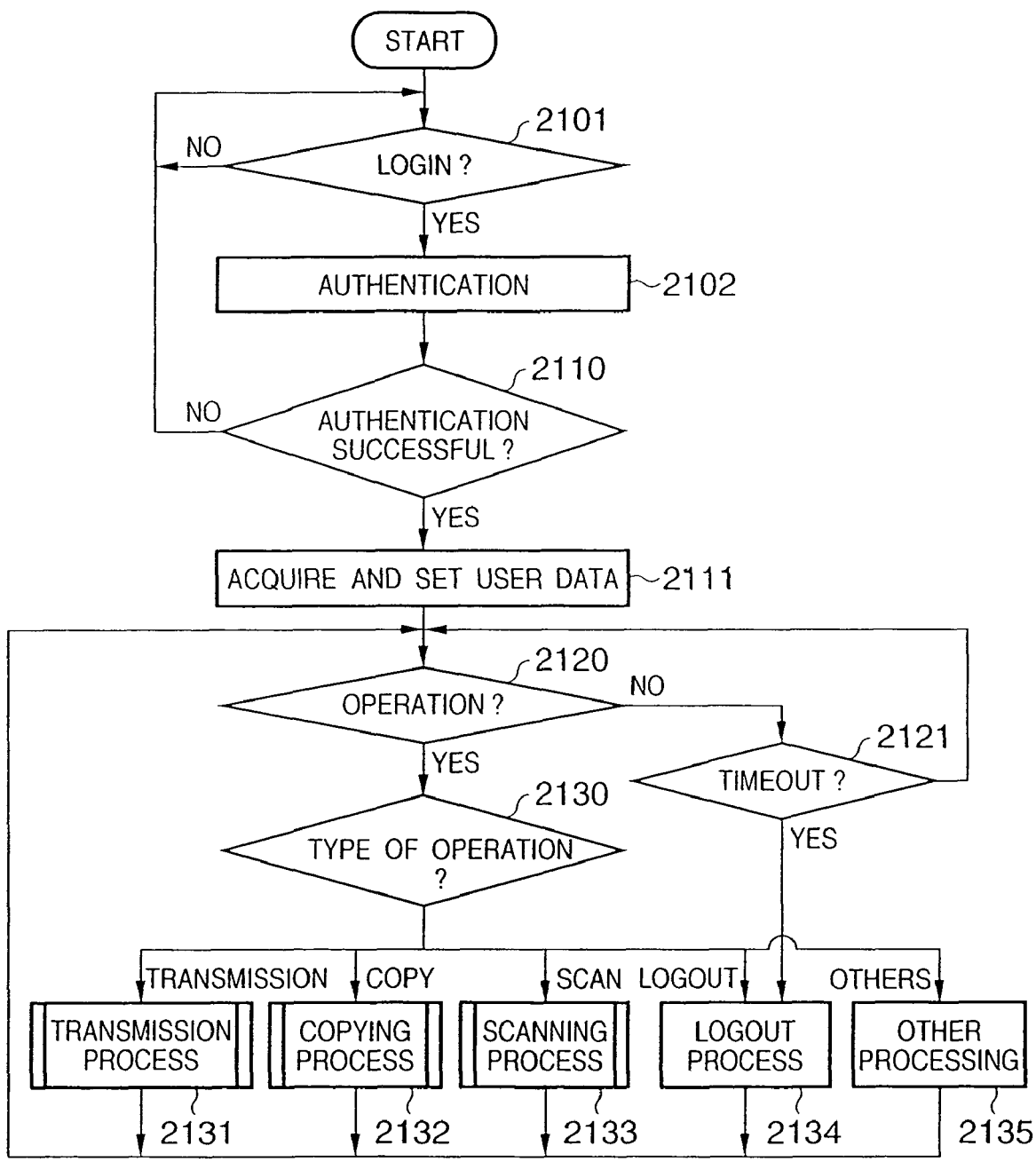
FIG. 3 is a flow chart of processing in a multifunctional device in the first and third embodiments.

FIG. 3 is a flow chart of the multifunctional device especially when a user operates the operation unit 2010 to process various jobs.

In the wait state, the multifunctional device displays a window for prompting the user to log in on the display unit of the operation unit 2010. When the user performs a predetermined operation in this window, a procedure shown in FIG. 3 is executed.

In step 2101, if the user enters a user ID and password from the operation unit 2010 in this wait state, the flow advances to step 2102. If no login operation is performed, the flow returns to step 2101 to maintain the wait state.

In step 2102, the information input by the user is used to communicate with the server 1001 to authenticate the user.

If this user authentication is successful in step 2110, the flow advances to step 2111 to acquire, from the server 1001, address data and device setting data, such as a scanner read mode and a scan data transmission address, unique to the user who has logged in, and set the acquired data in the memory 2031 of the device.

After that, information indicating that operations such as copying, facsimile transmission, and data registration are possible is displayed on the display unit, and the flow advances to step 2120. At the same time, a timer for starting a forced logout process is activated.

If the authentication has failed, an alarm sound is generated or a warning message is displayed, the login window is redisplayed, and the flow returns to step 2101.

In step 2120, a user operation is awaited. If an operation is performed, the flow advances to step 2130; if not, the flow advances to step 2121.

In step 2121, if timeout of the timer for monitoring forced logout is detected, the flow advances to step 2134; if not, the flow returns to step 2120.

In step 2130, the flow branches in accordance with the type of operation, e.g., copying, facsimile transmission, or data registration. That is, the flow advances to steps 2131, 2132, 2133, 2134, and 2135 when a FAX transmission operation, copying operation, scan operation, logout operation, and another operation are performed, respectively.

Step 2131 is a process when a transmission operation is performed. Details will be described later with reference to FIG. 4.

Figure 4:
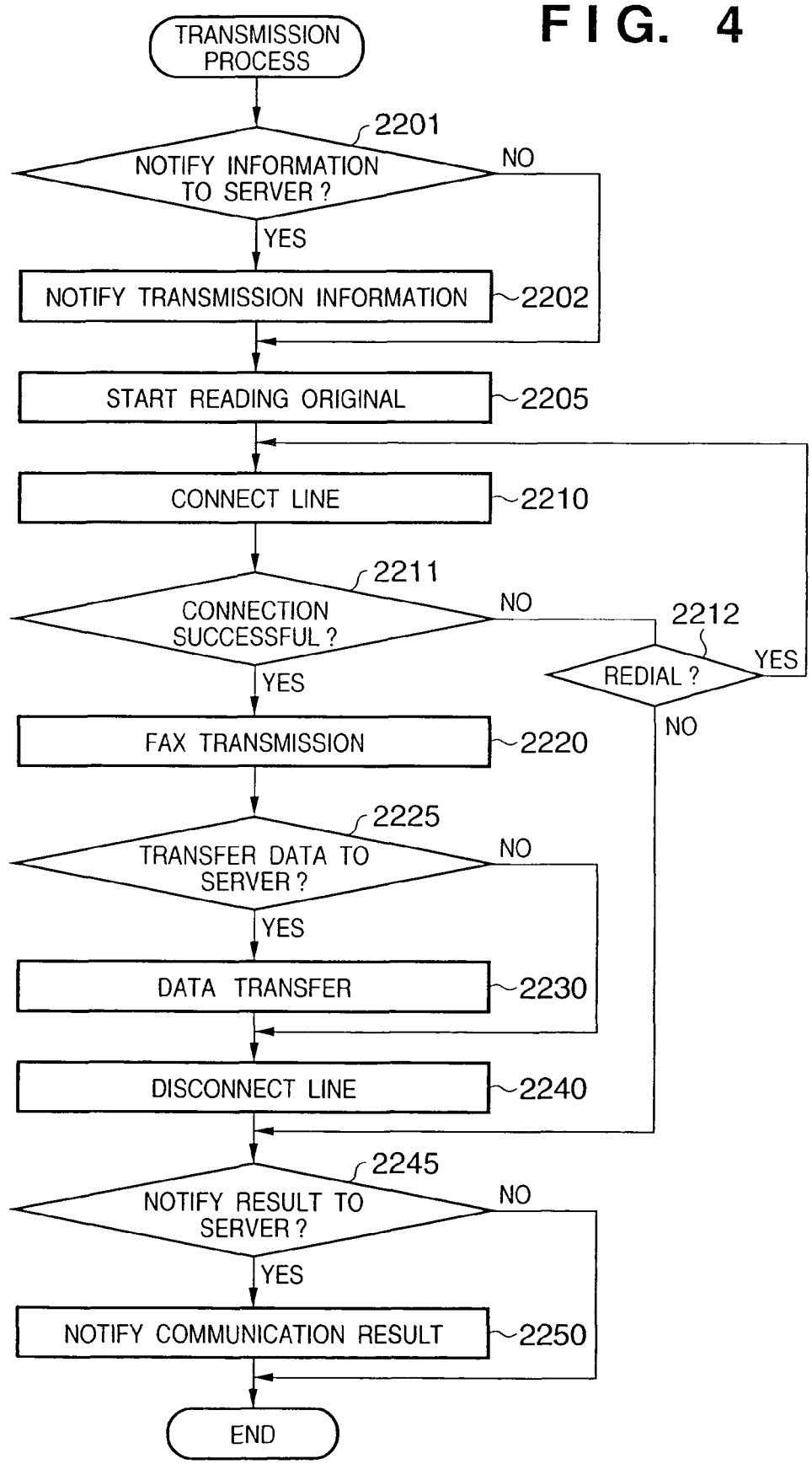
FIG. 4 is a flow chart of a facsimile transmission process in the multifunctional device.

Step 2132 is a process-when a copying operation is performed. In this step, at the same time a copying process is performed, information concerning the process is notified to the server 1001. This process is analogous to the process performed when the FAX transmission process shown in FIG. 4 is performed. That is, the server is informed of an operator, the type of printing sheets used in printing, and the number of the sheets used.

Step 2133 is a process when a scan operation is performed. In this step, the scanner 2016 reads an image on an original, and the data is transferred to the server 1001. Prior to this data transfer, information pertaining to the scan process is transferred to the server 1001.

Step 2134 is a logout process which clears the setting data unique to the user set in the login process.

Step 2135 is a process, such as data registration, other than the above processes.

FIG. 4 is a flow chart for explaining processing performed in the multifunctional device when a user transmits an original by facsimile by operating the operation unit 2010 of the device. This processing corresponds to step 2131 in FIG. 3.

If notification is set for the user who has logged in, the flow advances to step 2202 to notify the server 1001 of the information operated by the user.

More specifically, the server 1001 is informed of the telephone number and name of the input address, the sender name used, and the job ID. If NO in step S2201, the process is skipped, and the flow advances to step 2205.

In step 2205, reading of an original set on the scanner 2016 is started. That is, the scanner 2016 is driven in accordance with the set conditions, e.g., the resolution select key, read density adjust key, and read mode (character mode/photograph mode) of the operation unit 2010, thereby performing appropriate image processing. The read data is sequentially stored in an image memory of the memory 2031. In this step, another process for performing this processing is merely activated, and actual read control is executed by this process.

Step 2210 is a process for dialing the address input by the user and connecting the line.

In step 2211, the flow branches in accordance with whether the line is successfully connected to the address. If YES in step 2211, the flow advances to step 2220; if NO in step 2211, the flow advances to step 2212 to perform redialing in accordance with preset contents.

In step 2220, the image data read by the process in step 2202 is converted into facsimile codes, and the codes are transferred to a facsimile transmission buffer and transmitted by facsimile. When the data is converted into facsimile codes, the resolution is sometimes converted in accordance with the receiving capability of the destination apparatus. The facsimile transmission buffer is formed in the memory 2031. Assume that facsimile transmission is performed following the procedure defined by ITU-T recommendations T. 30. In this step, this processing is merely activated, and the processing is actually executed by another process.

Step 2225 is a branching step of checking whether the transmitted image data is to be transferred to the server 1001. Assume that information indicating whether this transfer is to be performed is preset for each user. If transfer is set for the user who has logged in, the flow advances to step 2230; if not, the flow advances to step 2240.

In step 2230, the image data completely transmitted by facsimile in step 2220 is transferred from the facsimile transmission buffer to an i/f data buffer formed in the memory 2031 and further transferred from the buffer to the server 1001. In this step, this transfer process is merely activated, and actual transfer is executed by another process. The server 1001 inquires about the presence/absence of untransferred transmission image data in accordance with the transmission job ID previously notified in step 2002. If untransferred image data is present, the server 1001 requests transfer of the image data.

In step 2240, the line is disconnected after the facsimile transmission.

In step 2245, whether facsimile transmission result information is to be notified to the server 1001 is determined on the basis of the settings unique to the user. If YES in step 2245, the flow advances to step 2250; if not, the process is completed.

In step 2250, information concerning the facsimile transmission is notified to the server 1001. In this step, the server 1001 is informed of, e.g., the transmission result (normal/abnormal), the communication start time, the communication time, the communication charge, and the number of communicated pages. Note that the transmitted information is stored in the server 1001 for each user, as will be described later.

Figure 5:
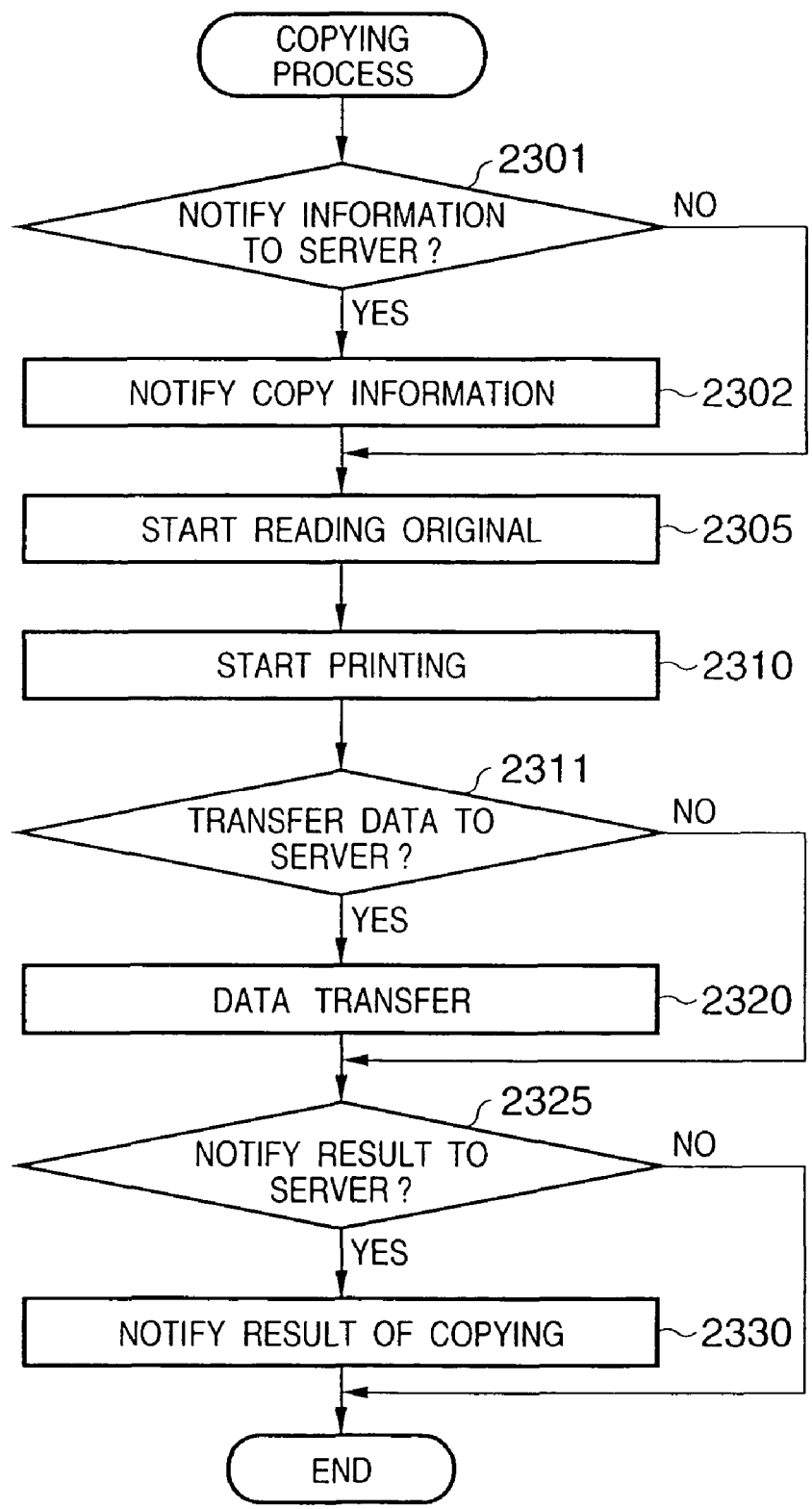
FIG. 5 is a flow chart of a copying process in the multifunctional device.

FIG. 5 is a flow chart for explaining processing performed in the multifunctional device when a user copies an original by operating the operation unit 2010 of the device. This processing corresponds to step 2132 in FIG. 3.

In step 2301, whether facsimile copy operation information of the user is to be notified to the server 1001 is checked. Assume that information indicating whether this notification is to be performed is preset in the memory 2031 for each user. If notification is set for the user who has logged in, the flow advances to step 2302 to notify the server 1001 of the information operated by the user.

More specifically, the server 1001 is informed of the identification information of the operator, the input number of copies, read edit mode information (e.g., a magnification, trimming information, masking information, and a character/photograph mode), and the job ID. If NO in step S2301, the process is skipped, and the flow advances to step 2305.

In step 2305, reading of an original set on the scanner 2016 is started. That is, the scanner 2016 is driven in accordance with the set conditions, e.g., the read edit mode of the operation unit 2010, thereby performing appropriate image processing. The read data is sequentially stored in the image memory of the memory 2031. In this step, another process for performing this processing is merely activated, and actual read control is executed by this another process.

Step 2310 is a process for performing printing in accordance with the number of copies input by the user. That is, an image based on the read data stored in the image memory in step 2305 is printed on a printing sheet by controlling the printer 2021. In this step, another process for performing this processing is merely activated, and actual print control is executed by this another process.

Step 2311 is a branching step of checking whether the image data completely printed is to be transferred to the server 1001. Assume that information indicating whether this transfer is to be performed is preset for each user. If transfer is set for the user who has logged in, the flow advances to step 2320; if not, the flow advances to step 2330.

In step 2320, the image data completely printed in step 2310 is transferred from a print buffer formed in the memory 2031 to the i/f data buffer similarly formed in the memory 2031 and further transferred from the buffer to the server 1001. In this step, this transfer process is merely activated, and actual transfer is executed by another process. The server 1001 inquires about the presence/absence of image data in accordance with the copy job ID previously notified in step 2302. If image data is present, the server 1001 requests transfer of the image data.

In step 2325, whether copy result information is to be notified to the server 1001 is determined on the basis of the settings unique to the user. If YES in step 2325, the flow advances to step 2330; if not, the processing is completed.

In step 2330, information concerning facsimile transmission is notified to the server 1001. In this step, the server 1001 is informed of, e.g., the copy result (normal/abnormal) and the number of copied pages. Note that the transmitted information is stored in the server 1001 for each user, as will be described later.

Figure 6:
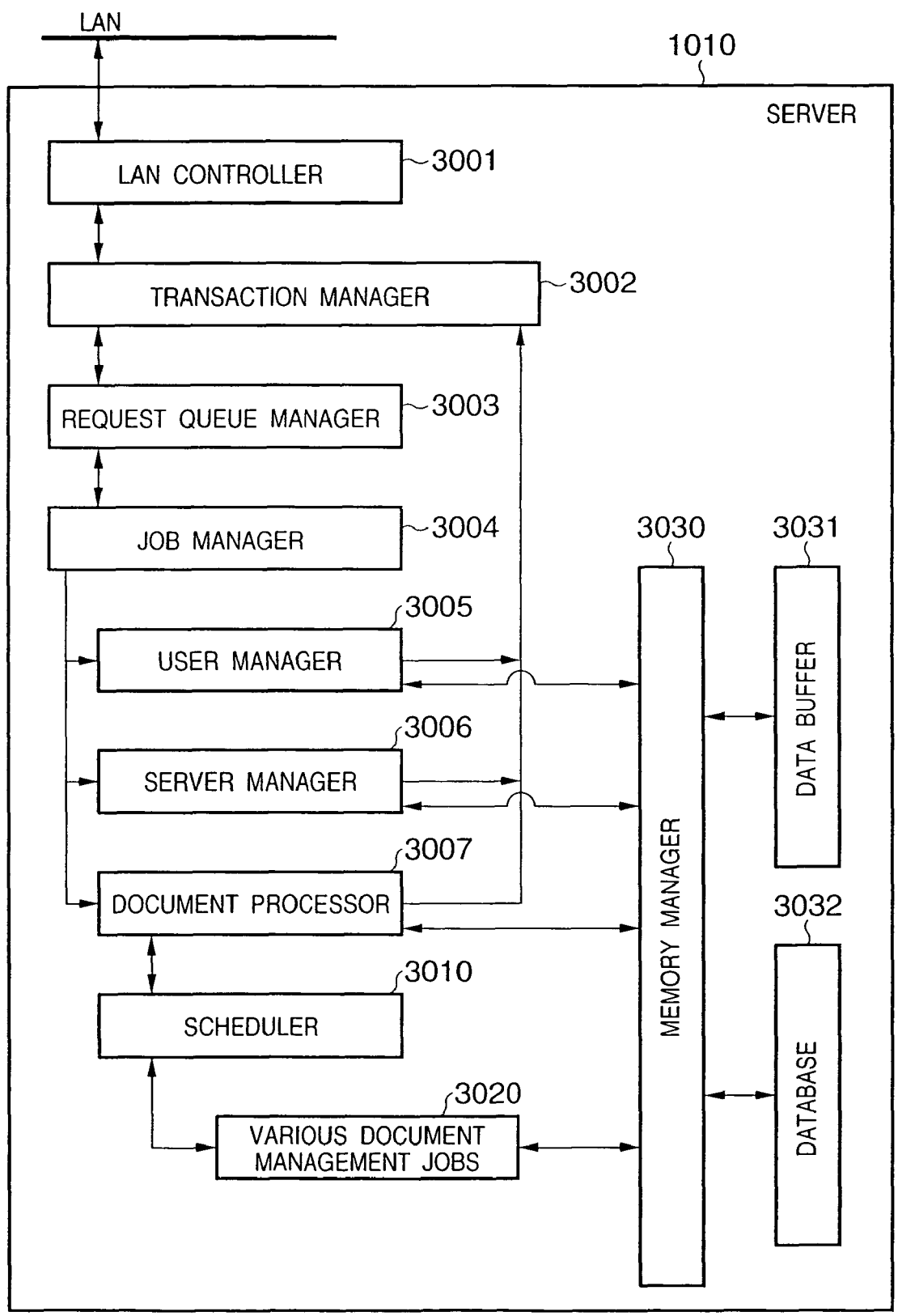
FIG. 6 is a block diagram of a document distribution server.

FIG. 6 is a block diagram of the document distribution/management server 1001 of this embodiment.

Reference numeral 3001 denotes a LAN controller. The basic functions of this LAN controller 3001 are provided by a network OS in which a server application is installed.

A transaction manager 3002 performs individual communications with a device on the LAN under the management of the server and with a client terminal via the LAN controller 3001 in accordance with the results of internal processing.

Basically, a request queue manager 3003 temporarily, internally manages queues of various request messages asynchronously transferred from a device and a client, and performs processing in accordance with the contents of each request. However, it is also assumed that a request requiring scheduling is generated in the server.

A job manager 3004 transfers processing to a corresponding one of various job processors in accordance with the contents of a request from a device, a client, or, in some instances, from inside the server.

Reference numeral 3005 denotes a user manager for processing jobs pertaining to user management. Basically, this user manager 3005 processes jobs concerning management of a user (client) and a device under the management. For example, the user manager 3005 checks for a connection (login) request from each client or device and also manages and controls document information managed for each user, handling of address information, and the job processing status and resource state of a device.

Reference numeral 3006 denotes a server manager for processing jobs pertaining to server management. Basically, this server manager 3006 provides the manager of the server with service functions such as settings of the server, backup of data, and acquisition of service log data.

A document processor 3007 handles processes pertaining to the whole document processing in this server. This document processor 3007 transfers the control right to a scheduler 3010 where necessary and executes various jobs 3020 under the management of this scheduler 3010.

Figure 7:
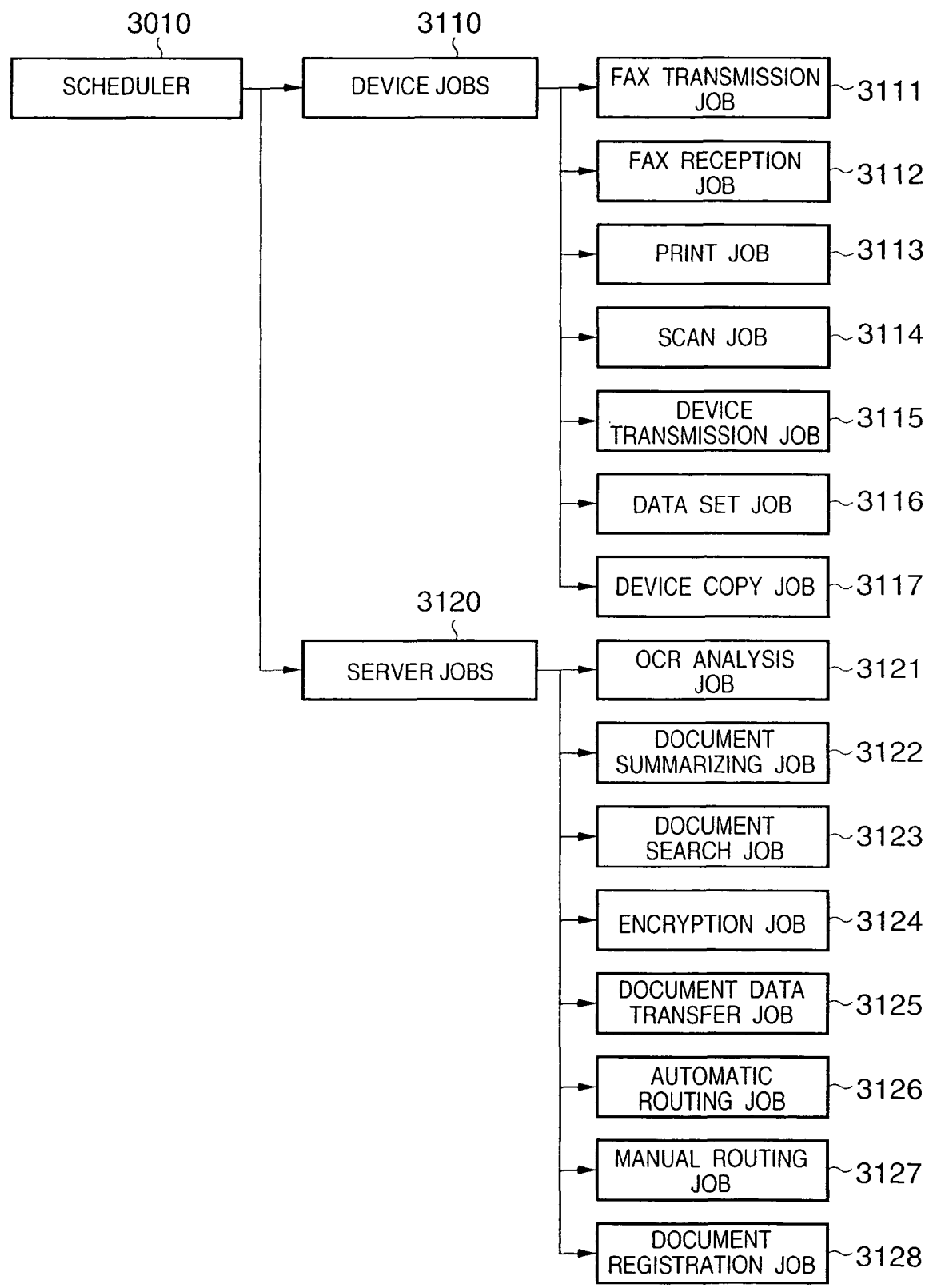
FIG. 7 is a view showing examples of document processing jobs in the document distribution server.

Note that practical examples of the various jobs 3020 are shown in FIG. 7.

Reference numeral 3030 denotes a memory manager. Diverse data processed by the server are stored and managed in a database 3031 under the management of the memory manager 3030 and referred to or readout where necessary. A practical example of the database 3031 is shown in FIG. 8. The data stored in this database are exchanged with the MDF 1010 via a data buffer 3310.

The document distribution/management server 1001 has the above arrangement. The above blocks are realized by installing application programs for achieving the aforementioned diverse functions into a hard disk of a personal computer or the like, and loading and executing these programs.

<Types of Jobs>

FIG. 7 is a view showing various document processing jobs of the document distribution/management server 1001 of this embodiment. These jobs are roughly classified into device jobs 3110 for transferring job data between the server and a device and server jobs 3120 processed in the server or limited to data processing between the server and a client.

Schedules of these two kinds of jobs are separately managed.

(1) Device Jobs

A Fax transmission job 3111 receives transmission request job data from each client and requests a device to perform Fax transmission.

A Fax reception job 3112 receives Fax reception data from a device and stores and manages this Fax reception data in the server. If distribution destination client data is added by a device, distribution is performed by managing the data as being unique to the client (user). If the distribution destination is unknown, the process is transferred to an automatic routing job 3126 (to be described later), thereby performing distribution by extracting the distribution destination from the received image data.

A print job 3113 controls processing for a printing request job, from a client, with respect to an image document stored and managed in the server.

A scan job 3114 receives data obtained by a device by reading an image on an original and manages the data as a file in a read-only folder of a predetermined user to allow the user to access the data.

A device transmission job 3115 receives data transmitted by FAX by operating the operation unit 2010 of a device and the communication information from the device, and manages as transmitted data of a predetermined user in a database. In this embodiment, the data is managed in a SentFax folder of the user.

A data set job 3116 transfers device setting data of each user to a device and sets the data in the device.

A device copy job 3117 receives data obtained by copying an original by operating the operation unit 2010 of a device and copying process information from the device, and manages copied data of a predetermined user in a database. In this embodiment, the data is managed in a Scan folder of the user.

(2) Server Jobs

An OCR analysis job 3121 performs OCR for received documents and scanned documents stored and managed as image data. This job can perform OCR directly for a whole designated document or can be activated from a document summarizing job 3122 or the routing job 3126 in accordance with the purpose. For example, it is possible to extract address data from a received document or perform OCR for entire image data to convert the whole sentence into electronic data containing character codes.

The document summarizing job 3122 summarizes the contents of a character-coded document stored in the server.

A document search job 3123 searches for a document stored in the server.

An encryption job 3124 encrypts a document stored in the server when needed and thereby ensures the security of the document.

A document data transfer job 3125 transfers image data to a client. If reduction of the display size is requested, the document data transfer job 3125 transfers reduced display data.

The automatic routing job 3126 performs distribution by causing the OCR analysis job 3121 to extract the address of a received document and moving the document to a management area of a user corresponding to the extracted address.

A manual routing job 3127 provides a function of visually showing the contents of a temporarily stored received document to a specially permitted client user and allowing the user to confirm a predetermined address, and a function of manually moving, in the server, the document to a folder of a user on the network.

A document registration job 3128 registers a document in the server in accordance with a request from a client.

<Configuration of Database in Document Distribution/Management Server>

FIG. 8 is a view showing the configuration of a database in the document distribution/management server 1001 of this embodiment. This database is constructed on a hard disk of the server 1001. Data are classified into user specific data managed by each user and shared data shared by users. As the shared data, the following data are managed.

(1) User Management Information

The user name, user password, user settings, device setting information, and the like.

(2) Server Management Information

The number of user licenses, time, server application version, and the like.

(3) Shared Address Data

Address data shared by users. The address on the LAN of each user on the network is automatically registered.

(4) Shared Document Data

Document data shared by users.

(5) Shared Document Annotation Data

Annotation information for a shared document.

(6) Log Management Data

The log of a job executed by using a device.

FAX communication records and copy records are managed.

(7) Temporarily Saved Data

A fax received document transferred without specifying the address.

As the data in units of users, the following data are managed.

(1) InBox Data

Received document data primarily transferred from a device.

(2) OutBox Data

Document data requested to be transmitted, which is to be transferred to a device.

(3) Scan Data

Document data read by a scan job and transferred.

(4) SentFax Data

Document data already transmitted.

(5) Trash Data

Temporarily saved document data found to be unnecessary.

(6) User Dedicated Folder Data

A document moved and copied by a user to a folder individually set by the user.

(7) User Dedicated Address Data

Address information uniquely set by a user. The data contains information to be transferred as compacted data to a device.

(8) Device Setting Data

Device setting data such as a read mode which is downloaded to a device when a user logs in from the device.

FIG. 9 is a view showing a data flow in a system via the document distribution/management server 1001 of this embodiment. The multifunctional device (MFD) 1010 and the server 1001 transfer data via the data buffer 3310. This data buffer 3310 includes:

(1) a FAX transmission requesting data buffer
(2) a FAX receiving data buffer
(3) a print data buffer
(4) a scanner data buffer
(5) a device transmission data buffer
(6) a device setting data buffer Data in these data buffers can be mixedly transferred in units of data packets to the MFD 1010.

In the server, internally necessary data transfer is performed between the data buffer 3310 connected to the MFD 1010 and a database 3031.

Basically, the clients 1020 to 1022 receive various services by transferring data to (by accessing) the database 3031 in the server 1001.

For example, user 1 (1020) as a client can receive various services by accessing a data area in a common data area of the server and a user 1 data area individually managed for this user 1.

Figure 10:
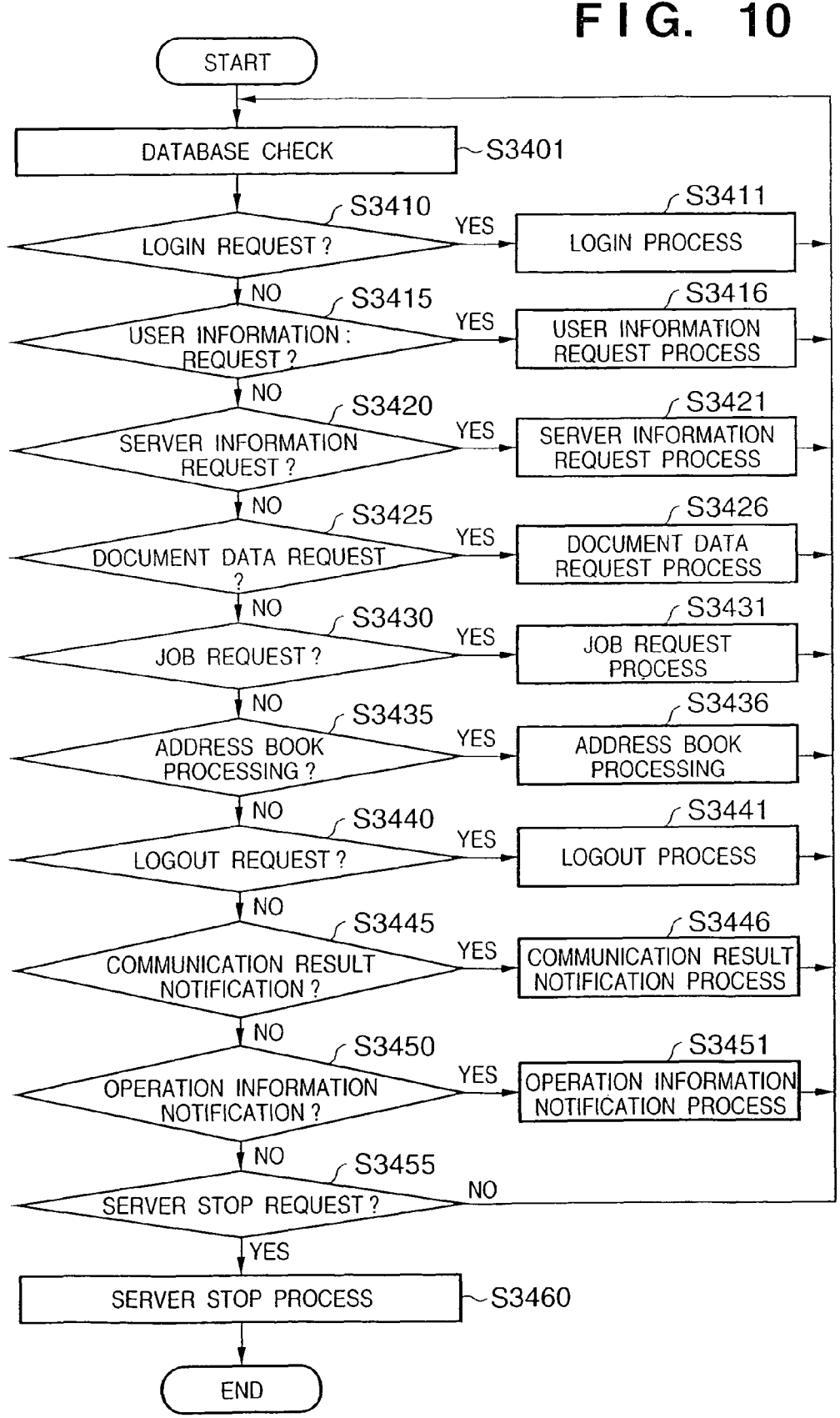
FIG. 10 is a flow chart of basic processing in the document distribution server.

FIG. 10 is a flow chart showing the procedure of basic processing in the document distribution/management server 1001.

Step S3401 is a process of checking the database when the power supply is switched on.

In step S3410, the presence/absence of a login request to the server from various clients and devices is confirmed.

If there is a login request, the flow advances to step S3411 to perform a login process including a password check. This process is executed by the user manager 3005 shown in FIG. 6.

In step S3415, the presence/absence of a user information request from the client is confirmed. If there is a user information request, the flow advances to step S3416 to transfer individual user data and shared data to the client in accordance with the request contents. This process is executed by the user manager 3005 shown in FIG. 6.

In step S3420, the presence/absence of a server information request from the client is confirmed. If there is a server information request, the flow advances to step S3421 to transfer data unique to the server to the client in accordance with the request contents. This process is executed by the server manager 3006 shown in FIG. 6.

In this step, a log is also read out and transmitted to the client, which log contains the operation information of each user received from the device 1010 in step 2202 of FIG. 4 and step 2302 of FIG. 5 and stored as log data in the subsequent step and the job processing result of each user received from the device 1010 in step 2250 of FIG. 4 and step 2330 of FIG. 5 and stored in the database in the subsequent step.

In step S3425, the presence/absence of a document data request from the client is confirmed. If there is a document data request, the flow advances to step S3426 to transfer the data of the designated document. This process is executed by the document processor 3007 shown in FIG. 6.

In step S3430, the presence/absence of diverse job requests from clients or devices is confirmed. If there is a job request, the flow advances to step S3431 to process job data corresponding to the type of the designated job. Various jobs are processed by the document processor 3007 shown in FIG. 6.

In step S3435, the presence/absence of a processing request concerning address book processing is confirmed. If there is a processing request, the flow advances to step S3436 to perform processing pertaining to collection, registration, and change of address information.

In step S3440, the presence/absence of a logout request is confirmed. If there is a logout request, a logout process is performed in step S3441.

In step S3455, the presence/absence of a server stop request is confirmed. If there is a request, a stop process is performed in step S3460.

In step S3445 whether the job processing result notification transmitted in step 2250 of FIG. 4 and step 2330 of FIG. 5 is received is checked. If the notification is received, the flow advances to step S3446 to store the job processing result in a log management area of the database 3031.

In step S3450 whether the operation information notification transmitted in step 2202 of FIG. 4 and step 2302 of FIG. 5 is received is checked. If the notification is received, the flow advances to step S3451 to store the operation information in a log area of the database 3031.

Following the above procedure, the server 1001 executes various processes in accordance with a request from a client terminal, an operation performed using the keyboard of the server 1001 by an operator, or various requests from the MFD 1010.

<Arrangement of Client Terminal>

Figure 11:
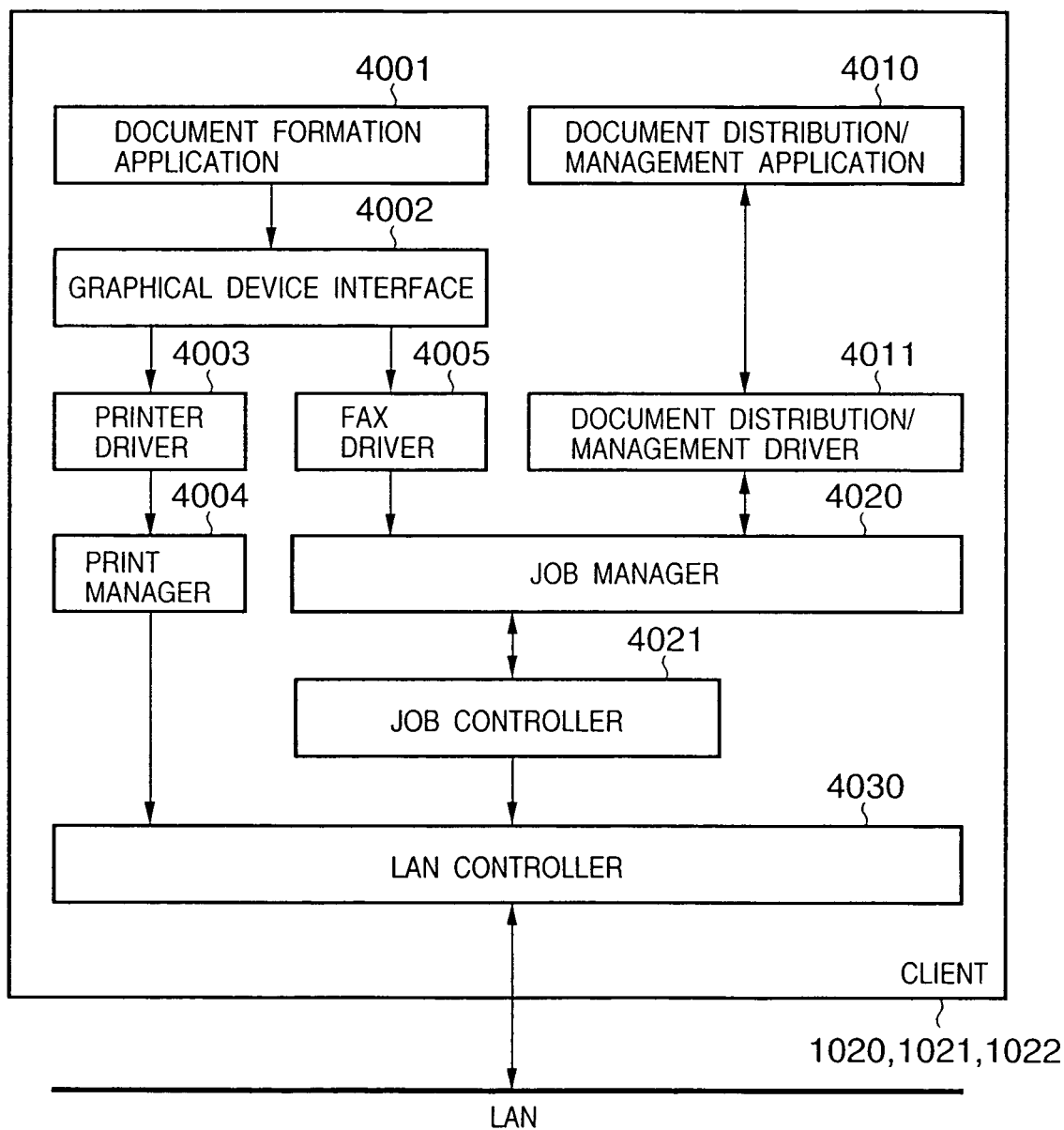
FIG. 11 is a block diagram of a client.

FIG. 11 is a block diagram of a client terminal. Reference numeral 4001 denotes a general document formation application; 4002, a graphic device interface provided by the OS; 4003, a printer driver; and 4004, a print manager generally provided by the OS. A printing job requested by the application 4001 is passed through these modules 4002 to 4004 and processed on a printing system provided by the network OS via a LAN controller 4030.

Reference numeral 4005 denotes a FAX driver. This driver is selected when an application requests transmission, and the request is processed as a transmission request job via a job manager 4020 (to be described later).

A document distribution/management application 4010 provided by this embodiment provides a graphical user interface (GUI) for accessing the document distribution/management server.

More specifically, this document distribution/management application 4010 provides display of various data (e.g., FAX transmission/reception documents, scanner documents, and communication log information), a document edit function, various setting functions (including mode settings for converting a personal document into a shared document and address book settings), and various job designating operations (e.g., FAX transmission and document printing).

In this embodiment, several manager applications are prepared in addition to the general user applications. One is a received document manual distribution application. This application displays the contents of a received document temporarily saved in the server because its destination is unknown (or unanalyzable) and thereby allows a user to visually confirm the destination and set the document as a document for a predetermined user.

As another server manager application, a manager application capable of setting clients (users) using this server and performing device remote settings is also prepared.

A document distribution/management driver 4011 is provided in the same manner as above and handles various job data requested by applications via the job manager 4020.

This job manager 4020 manages a job requested by the application 4010.

A job controller 4021 performs data transfer with the server in accordance with various jobs.

The LAN controller 4030 generally controls communication on the LAN provided by the OS manufacturer.

Figure 12:
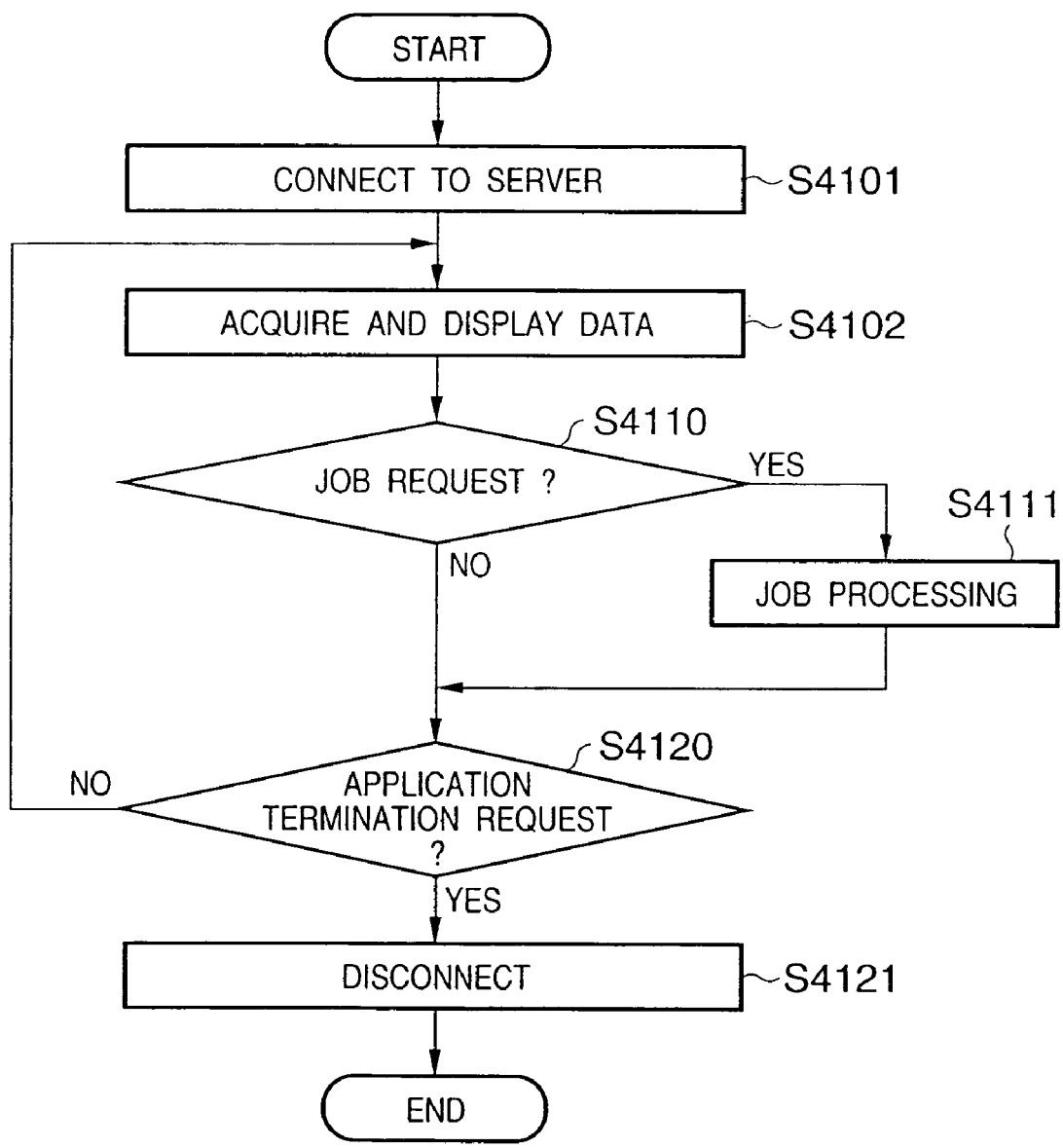
FIG. 12 is a flow chart of processing in the client.

FIG. 12 is a flow chart of processing by this client terminal.

In step S4101, the client terminal connects to (logs in to) the server 1001. In this step, user authentication (using a user ID and password) is performed for the user of the system of this embodiment.

Figure 21:
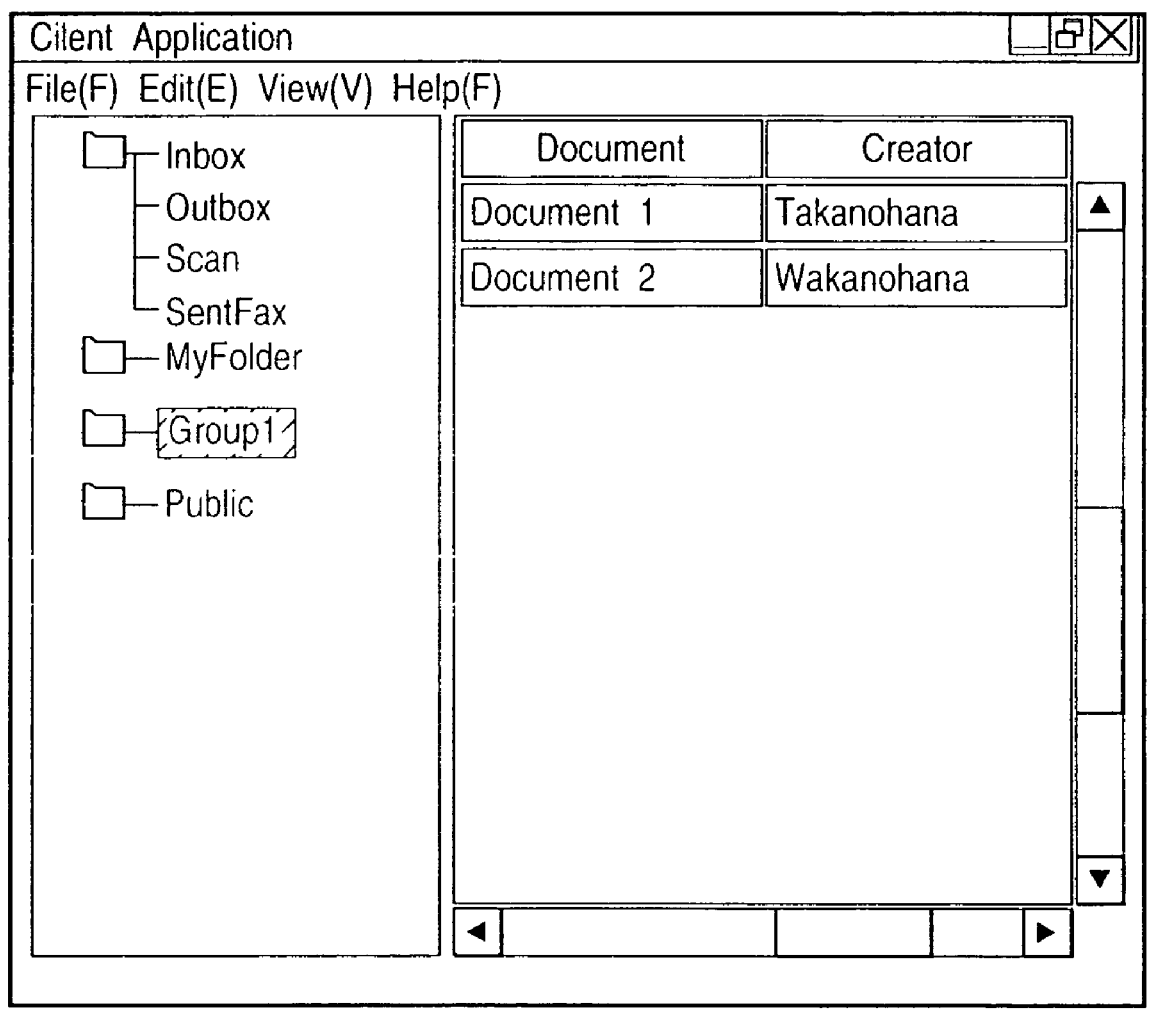
FIG. 21 is a view showing a display example of a client application.

In step S4102, data is uploaded from the server 1001 and displayed. As a result of the login process, data already managed on the server as data for this user is extracted, and predetermined data is displayed on the GUI. FIG. 21 shows a display example of a client application. In this example, a list of folders accessible by the user and a list of data contained in a selected folder are displayed.

In step S4110, the presence/absence of a job request from the user is searched for. If there is a job request, corresponding processing is performed in step S4111. This job includes read-out of a communication log from the server. The readout communication log is displayed on the screen or printed.

In step S4120, an application termination request is searched for. If there is no termination request, the flow returns to step S4102 to again upload data on the server and checks for the status, e.g., the presence/absence of a distribution document.

If there is an application termination request in step S4120, the flow advances to step S4121 to disconnect (log out) from the server and complete the processing.

In the document distribution/management system of this embodiment as described above, the log of processing by a multifunctional device connected to a LAN is recorded in a LAN server even if the processing is not performed across the LAN, and this processing log can be referred to from a LAN client permitted to access.

Second Embodiment

The system of this embodiment is substantially the same as the first embodiment, so a detailed description thereof will be omitted. However, in this embodiment, no communication log need be recorded in a server. Hence, as shown in FIG. 16, a data buffer 3310 of the server has no communication log area.

Figure 13:
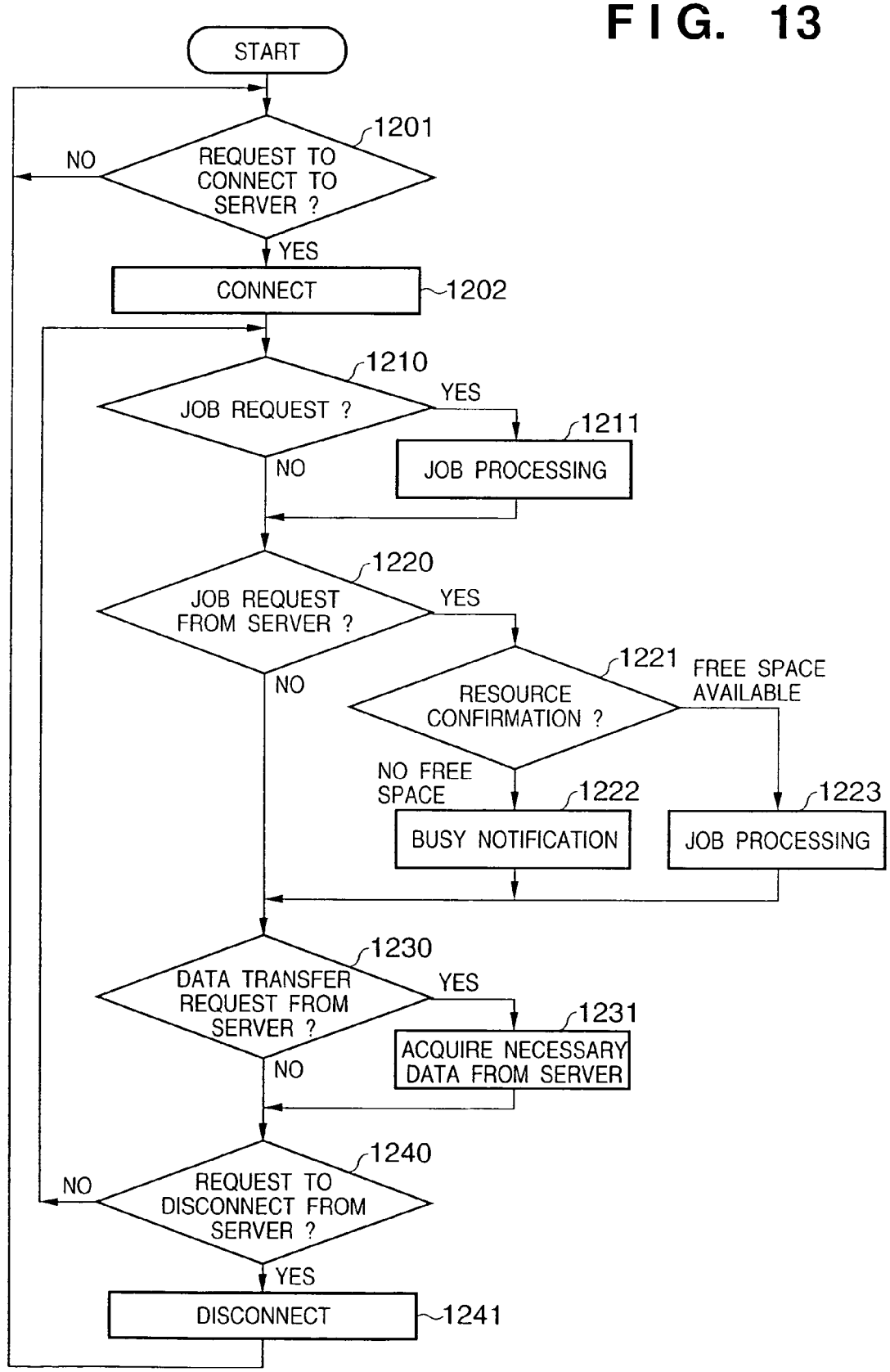
FIG. 13 is a flow chart of processing in a multifunctional device in the second embodiment.

A process procedure of a multifunctional device 1010 is shown in FIG. 13, instead of FIG. 3.

In step 1201, the MFD 1010 checks whether there is a request to connect to a server. This request to connect to a server can be issued from an operation unit 2010 or across the LAN. A server to be connected can also be chosen from a plurality of servers. Note that even when the MFD 1010 uses an address list or the like set in a server, a request to connect to a server is generated if an operator designates the use. A request to connect to a server is accompanied by authentication of the user as described above. That is, the user is asked to enter the user ID and password, and only an authenticated user is allowed to connect to a server.

In step 1202, the MFD 1010 connects to a server only when there is a connection request and the user is authenticated. If a server to be connected is designated, a parameter indicating the server name is added to data to be supplied onto the LAN to thereby inform the server. In this embodiment, assume that the MFD 1010 connects to a server 1001.

In step 1210, whether job data to be transferred to the server 1001 is present in the MFD 1010 is checked. If a received document transfer job, a scanner read job, or the like is present, the flow advances to step 1211 to transfer the job data to the server 1001.

In step 1220, whether a job request to the MFD 1010 is present in the server 1001 is checked. If a request is present, the flow advances to step 1221 to check for a free space in a resource in the MFD 1010. If it is determined that the job cannot be accepted at that time, the server 1001 is informed of a busy state in step 1222. If the job is acceptable, job processing is executed in step 1223. In this job processing, the job data is once stored in a memory 2031, and necessary processing such as facsimile transmission or printing out is performed after that.

In step 1230, whether the job requests shared setting data or setting data of each user, such as an address list. If YES in step 1230, the flow advances to step 1231 to ask the server for the necessary data and acquire the data. If the server is asked for setting data such as an address, the server reads out the setting data such as shared address data or address data of each user from a database and returns the readout data to the MFD 1010.

In step 1240, whether a request to disconnect from the server 1001 is issued is checked. If there is no such request, the flow returns to step 1210 to continue the processing. If the request to disconnect from the server 1001 is found, flow advances to step 1241 to disconnect from the server 1001 and terminate the processing.

Note that a process of registering the address list in a database 3031 of the server 1001 is performed in step S3416 of FIG. 10. This registration is done by registering data formed or corrected by the server 1001 into the database. It is also possible to register data formed by a client terminal in accordance with a request from the client. Furthermore, data formed by the MFD 1010 can be registered in the server.

As described above, even when the MFD 1010 is to perform facsimile transmission or a scan job, it is possible to ask the server 1001 for address data (e.g., the telephone number) of the transmission destination, acquire the data, and perform the facsimile transmission or the scan job by using the acquired address as the transmission destination. After the facsimile transmission or the scan job is performed, the log or the like is, of course, transferred to the server 1001 in accordance with the settings as described earlier.

Third Embodiment

A document distribution system of this embodiment has substantially the same arrangement as the first embodiment, so a description of a common arrangement will be omitted.

Figure 14:
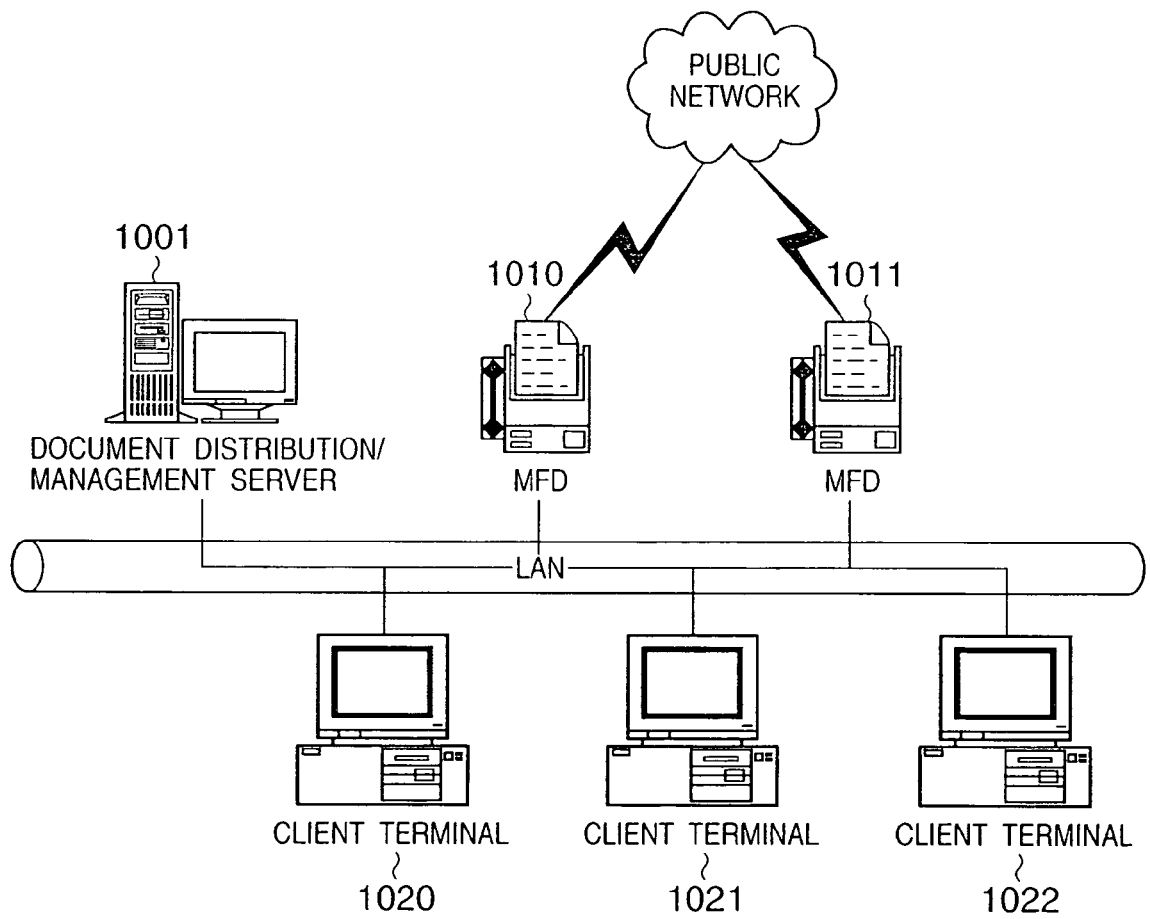
FIG. 14 is a view showing the arrangement of a document distribution system in the third embodiment.

FIG. 14 is a view showing the network configuration of this embodiment. As shown in FIG. 14, two MFDs 1010 and 1011 are connected to a LAN. Also, users are not only managed as individual users but also divided into desired groups, and shared data is given to each group or document distribution destinations are designated in units of groups. The arrangements of the MFD, a server, and a client are identical with those in the first embodiment.

In the system of this embodiment, however, the log of a job executed by the MFD is recorded in a server. Hence, a function of recording a log is added to the processing contents of device jobs shown in FIG. 7.

Referring to FIG. 7, a Fax transmission job 3111 receives transmission request job data from each client and requests a device to perform Fax transmission. The transmission destination name, the transmission destination number, the transmission start time, the communication time, the number of communicated pages, and the ID of the device which has executed the job are saved as log information. This log is saved in a document log data area in a database of a server 1001 shown in FIG. 15. This applies to all device jobs.

A Fax reception job 3112 receives Fax reception data from a device and stores and manages this Fax reception data in the server. In addition to the image data, the Fax reception job acquires from the device the communication start time, the communication time, the communication destination, the number of communicated pages, and the ID of the device, and saves them, in connection with the image, as log information together with the ID of the user who has requested the job.

If distribution destination client data is added by a device, distribution is performed by managing the data as being unique to the client (user). The distribution time, the distribution address, and the like are stored as log information in connection with the image. If the distribution destination is unknown, the processing is transferred to an automatic routing job 3126 to perform distribution by extracting the distribution destination from the received image data. A document whose distribution destination user can be specified is distributed by managing the document as data unique to that user. The distribution time, the distribution address, and the like are stored as log information in connection with the image.

If a distribution destination cannot be specified even after distribution destination extraction is performed, a received document distribution group of device data corresponding to a device which has received a document is referred to, and the received document is saved as received document data of the corresponding group data.

A print job 3113 controls processing for a printing request job, from a client, with respect to an image document stored and managed in the server. The ID of a user who has requested the job, the printing start time, the time required for printing, the number of printed pages, and the ID of a device which has executed the job are saved as log information.

A scan job 3114 receives data obtained by a device by reading an image on an original and manages the data as a file in a read-only folder of a predetermined user to allow the user to access the data. The transfer destination of the data, the scan start time, the time required for scan, the number of scanned pages, and the ID of the device are saved as log information. As the storage destination of a document, a shared folder or a group shared folder can also be selected in addition to a user folder. When this is the case, a user permitted to access these folders can refer to a scanned document by using a client application. Group data will be described later with reference to FIGS. 15 and 16.

As in the first embodiment, each of these jobs is executed in step 2131 of FIG. 3. Accordingly, log information is also saved in step 2131.

A device transmission job and a data set job of this embodiment are the same as in the first embodiment.

FIG. 15 is a view showing the configuration of a database of the document distribution/management server 1001 of this embodiment. This database is constructed on a hard disk of the server 1001. In this embodiment, a plurality of groups can be formed, and group data is added to each group in addition to the configuration shown in FIG. 8 described previously. The group data contains the following:

(1) User List
   A list of users belonging to the group.
(2) Usable Device List
   A list of multifunctional devices belonging to the group.
(3) Document Data
   A) Received Document Data
   Undistributed documents received by devices belonging to the group.
   B) Shared Document Data
   Document data shared by users belonging to the group.
   C) Shared Document Annotation Information
   Annotation information added to shared documents.

FIG. 16 is a view showing the data flow of a received document distribution process performed by the document distribution/management server 1001 in this embodiment.

The differences from FIG. 9 are that two MFDs are connected and that users are grouped and a group area 1601 for holding data of each group is prepared. That is, the server 1001 manages data concerning a plurality of MFDs. For example, user 1 can access a user 1 data area 1603 and a group 1 data area 1601 in addition to a common data area 1602.

Figure 17:
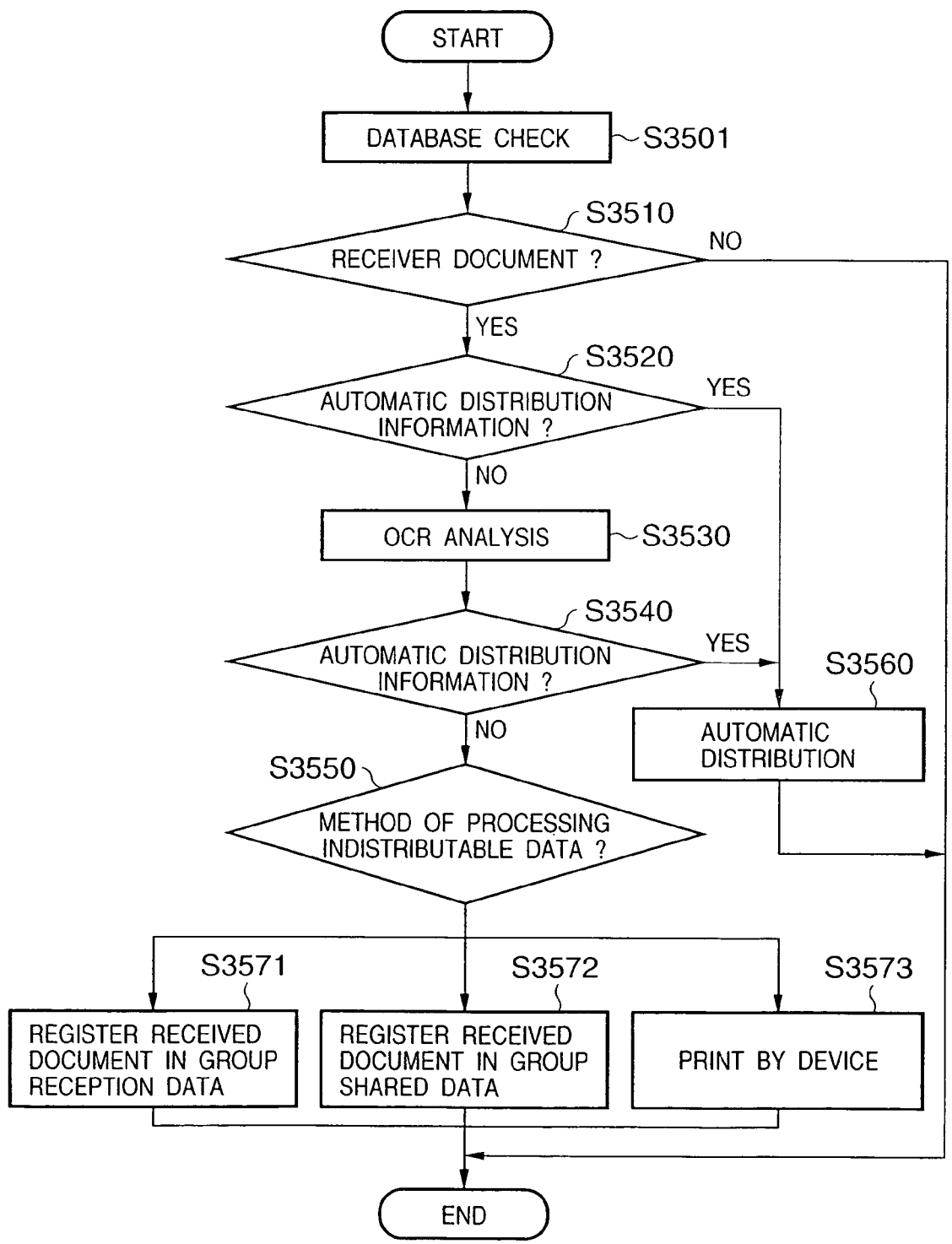
FIG. 17 is a flow chart of a document distribution process by the document distribution server in the third embodiment.

FIG. 17 is a flow chart for explaining processing performed by the server 1001 when the MFD transfers a facsimile received document.

In step S3501, the database is checked to verify whether a received document transfer request from a device is present. In step S3510, the processing is branched in accordance with the presence/absence of a received document. If no received document is present, the processing is completed. In step S3520, whether automatic distribution is possible is checked by referring to reception information. If data for distribution, e.g., SUB (sub-address) or DTMF signal information is added, it is determined that automatic distribution is possible, and automatic distribution in step 3560 is performed.

In step 3530, an OCR analysis job S3121 performs OCR analysis for the received document to extract the data for distribution. If in step S3540 identification information for distribution, e.g., the name of a recipient or code information for specifying a recipient can be specified, it is determined that automatic distribution is possible, and automatic distribution in step S3560 is performed.

In step S3550, device data of a receiving device is collated to collate a method of processing an indistributable received document. If the document is to be manually distributed, the flow branches to step S3571. If the document is to be stored in a shared folder of the group, the flow branches to S3572. If the document is to be printed by the device, the flow branches to step S3573.

In step S3560, the information for distribution is collated with the user management information explained in FIGS. 7 and 15, and the document is stored in an InBox data area of the corresponding user. The time of distribution and the data for distribution (e.g., SUB, DTMF, and OCR) are saved as log information in a log file.

In step S3571, to manually distribute the document by using a received document distribution tool, data received as received document data of a group as the distribution destination is registered in the database.

In step S3572, to allow users of the group to which the device belongs to share the document, data received as shared data of the group is registered in the database. The storage time, the storage party (server), and the storage method (automatic distribution) are saved as log information in a log file.

In step S3573, to print the received document by the device, a printing job is generated to perform printing. The MFD which has printed the document, the party (server) which has requested the printing, the number of printed copies, and the printing time are saved as log information in a log file.

Figure 18:
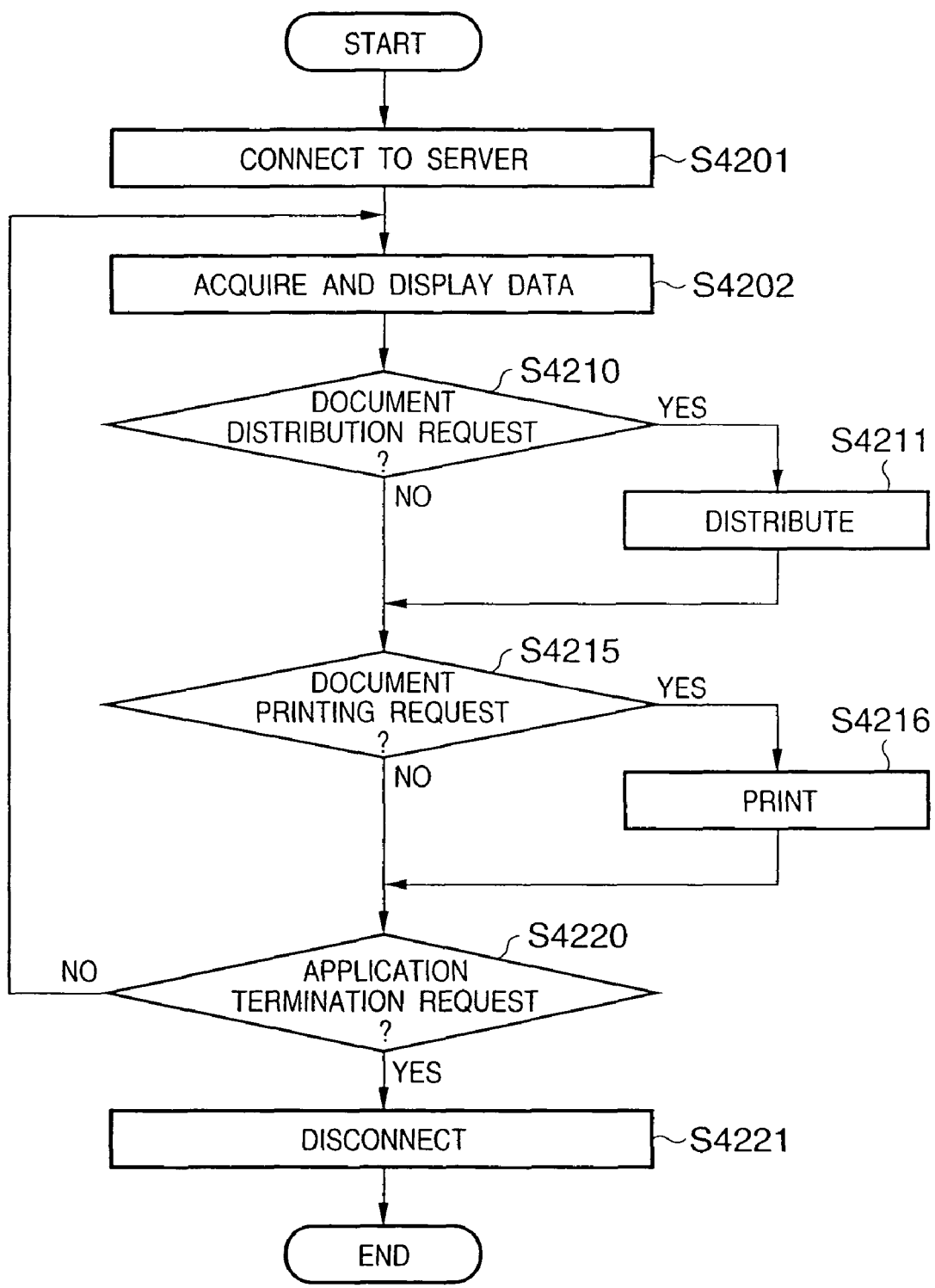
FIG. 18 is a flow chart of a document distribution process by a document distribution client in the third embodiment.

FIG. 18 is a flow chart showing processing by a received document distribution client terminal. In step S4201, a process of connecting to the server 1001 is performed. In this step, user authentication (e.g., collation of a user ID and password) is performed for the user of the system of this embodiment. In this authentication, the user enters the name of a group which performs distribution.

Figure 22:
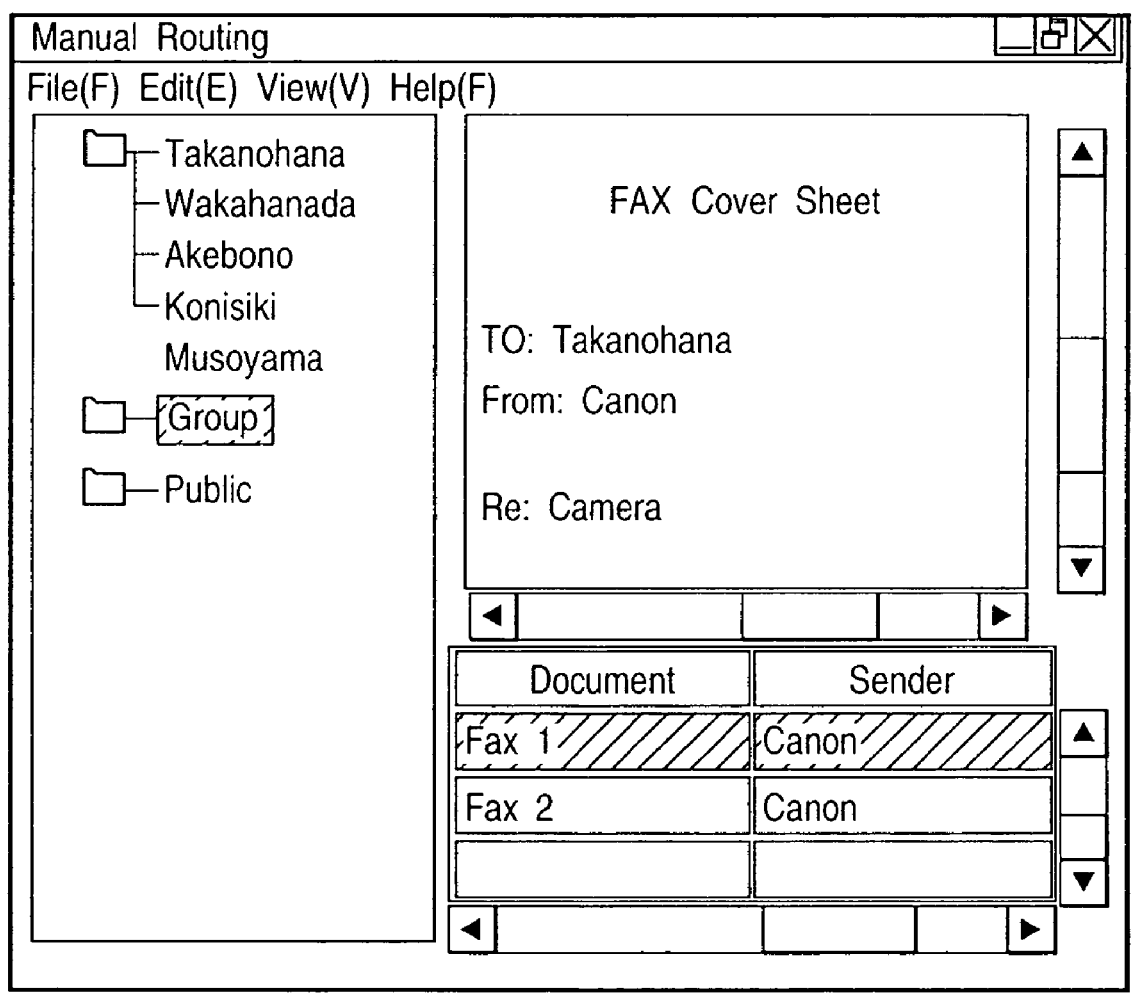
FIG. 22 is a view showing a display example of a manual distribution application.

In step S4202, data is downloaded from the server 1001 and displayed. As a result of connection to the server 1001, received document data already managed in the server as data of the input group and user names belonging to the designated group are extracted and displayed on the GUI. As shown in FIG. 22, a window is displayed which includes a portion capable of displaying, of the group data, at least a list of received documents and a portion capable of displaying a list of group users and folders shared by the group. When one of the documents displayed in the form of a list is selected, an image of the selected document is displayed. The user can read address information in the image and specify a user to which the document is to be distributed.

In step S4210, the flow branches in accordance with the presence/absence of a distribution request from the user.

If there is a distribution request, the flow advances to step S4211 to transfer the selected received data to InBox of the user chosen as a distribution destination. It is possible to select not only a single user but also a plurality of users or shared folders of the group as distribution addresses at once. To distribute to a plurality of users, the received data is distributed after being copied. The distributing party, the distribution address, and the distribution time are saved as log information in a log file.

In step S4215, the flow branches in accordance with the presence/absence of a printing request from the user. If there is a printing request, the selected received data is printed in step S4216. The MFD which has printed the data, the party who has requested the printing, the number of printed sheets, and the printing time are saved as log information in a log file. If the printing is performed by the MFD 1010 or 1011, the log data is desirably saved in a document log data area of the server 1001. If this is the case, a request to save the log data is issued to the server 1001.

In step S4220, an application termination request is searched for. If there is no termination request, the flow returns to step S4220, and data of the server is again downloaded to check for the status, e.g., the presence/absence of a distributed document.

If an application termination request is found in step S4220, the flow advances to step S4221 to disconnect from the server 1001 and terminate the processing.

In the document distribution/management system of this embodiment as described above, all logs of jobs executed by the MFD in accordance with requests from the server 1001 can be saved in the server. Also, the log of, e.g., printing of a document performed by a request from a client can be saved in the server.

Furthermore, users can be grouped, and documents can be distributed in units of groups.

Note that in the system configuration of this embodiment, the processes in the first and second embodiments are naturally performed.

The present invention can be applied to a system constituted by a plurality of devices (e.g., a host computer, interface, reader, and printer) or to an apparatus (e.g., a copying machine or facsimile apparatus) comprising a single device.

Further, the objects of the present invention can also be achieved by providing a computer-readable storage medium (or a recording medium) storing computer-readable program codes of software for performing the aforesaid functions according to the embodiments to a system or an apparatus, reading the program codes from the storage medium, and then executing the program by a computer (or a CPU or MPU) of the system or apparatus. The configuration of an MFD for achieving this is shown in FIG. 19. That is, a CPU 1901 executes programs loaded from a file storage device 1903 such as a CDROM into a memory 1902, thereby performing the procedures shown in the flow charts of FIGS. 3, 4, 5, and 13. Note that 1901 to 1904 are contained in a resource manager 2001.

Figure 20:
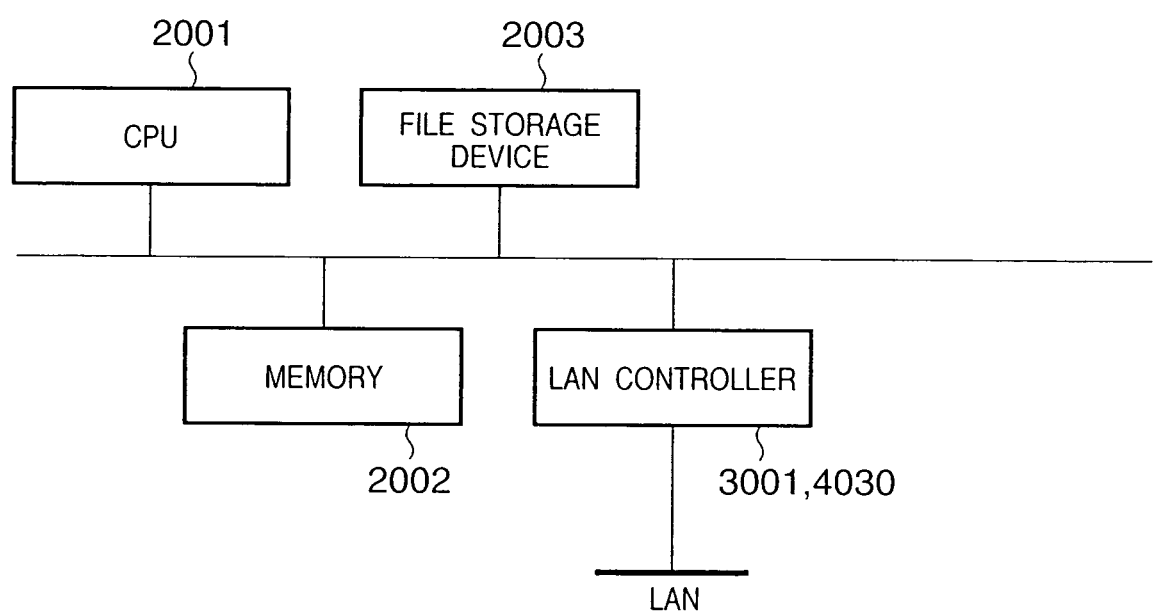
FIG. 20 is another block diagram of the server or client.

The configuration of a server and a client is shown in FIG. 20. In this configuration, a CPU 2001 executes programs loaded from a file storage device 2003 such as a CD-ROM into a memory 2002, thereby performing the procedures shown in the flow charts of FIGS. 10, 12, 17, and 18.

In this case, the program codes read from the storage medium realize the functions according to the embodiments, and the storage medium storing the program codes constitutes the invention.

Furthermore, besides aforesaid functions according to the above embodiments are realized by executing the program codes which are read by a computer, the present invention includes a case where an OS (Operating System) or the like running on the computer performs a part or the whole of actual processing in accordance with designations by the program codes and realizes functions according to the above embodiments.

Furthermore, the present invention also includes a case where, after the program codes read from the storage medium are written in a memory of a function extension board which is inserted into a computer or of a function extension unit which is connected to a computer, a CPU or the like of the function extension board or unit performs a part or the whole of actual processing in accordance with designations of the program codes and realizes functions of the above embodiments.

The embodiments as described above can provide a document distribution system in which it is possible not only to place a multifunctional device having, e.g., a printer function, facsimile function, and scanner function on a network and use it as a stand-alone device but also to allow each client on the network to effectively use these functions of the device.

Also, since a server collectively manage document data pertaining to each user, management functions (e.g., search and OCR analysis) with respect to document data can be easily extended.

Additionally, each user can access his or her own data and shared data from an arbitrary place.

Even when a user uses the multifunctional device by operating the operation unit as in the case of a conventional facsimile apparatus, the user can use address data formed by a computer. This improves the user friendliness.

In a network system to which a singly operable multifunctional device is connected, the log of communication performed by singly operating this multifunctional device can be referred to from a terminal on the network.

Furthermore, in a network system to which a singly operable multifunctional device is connected, communication can be performed by singly operating this multifunctional device by referring to data such as an address stored in a terminal on the network.

Since setting data of the multifunctional device is replaced for each user, the device need not hold setting data of all users. This can reduce the memory quantity for holding data.

Further, the log of processing using a multifunctional device connected to a network can be left as recording.

Also, setting is independently performed for each user, and processing is performed in accordance with authentication of a user who has logged in. Hence, it is readily possible to perform processing desired by each user.

As many apparently widely different embodiments of the present invention can be made without departing from the spirit and scope thereof, it is to be understood that the invention is not limited to the specific embodiments thereof except as defined in the appended claims.

What is claimed is:

1. A copying apparatus comprising:
    a reader that reads an image of a document and generates image data based on the image;
    a printer that prints images;
    an entering unit that enters user information specifying a user who operates said copying apparatus;
    a connector that connects said copying apparatus with a network; and
    a transfer unit that transfers, when said copying apparatus performs a copying operation by which said printer prints the image of the document read by said reader, the image data generated by said reader, the user information entered by said entering unit, and log information of the copying operation to a predetermined terminal on the network through said connector.

2. The apparatus according to claim 1, further comprising a user authentication unit that performs a user authentication for admitting to use said apparatus, wherein said entering unit enters the user information based on the user authentication by said user authentication unit.

3. The apparatus according to claim 1, further comprising a reception unit that receives setting information in accordance with the user information from the predetermined terminal on the network through said connector.

4. The apparatus according to claim 1, wherein said entering unit enters the user information by a manipulation of an operation panel equipped to said apparatus.

5. The apparatus according to claim 1, wherein the log information includes page information which indicates the number of copied pages.

6. The apparatus according to claim 1,
    wherein said apparatus performs a scan function for transmitting the image of the document read by said reader to an apparatus on the network, and
    wherein said transfer unit transmits the image data generated by said reader, the user information entered by said entering unit, and log information of the scan function to the predetermined terminal on the network through said connector when said apparatus performs the scan function.

7. A copying method for a copying apparatus, the method comprising:
    reading an image of a document and generating image data based on the image;
    entering user information specifying a user who operates the copying apparatus; and
    when a copying operation by which the image of the document read by said reading is printed, transferring the image data, the user information, and log information of the copying operation to a predetermined terminal on a network, wherein the transferring is performed, at least in part, by the copying apparatus.

8. A non-transitory computer-readable storage medium storing computer-executable program codes that, when executed, cause a computer to perform a method comprising:
    reading an image of a document and generating image data based on the image;
    entering user information specifying a user who operates a copying apparatus; and
    when a copying operation by which the image of the document read by said reading is printed, transferring the image data, the user information, and log information of the copying operation to a predetermined terminal on the network.

* * * * *